United States Patent
Chen et al.

(10) Patent No.: US 8,767,684 B2
(45) Date of Patent: Jul. 1, 2014

(54) METHOD AND APPARATUS THAT FACILITATES OPERATING A RELAY VIA A MULTIMEDIA BROADCAST SINGLE FREQUENCY NETWORK BASED BACKHAUL LINK

(75) Inventors: Wanshi Chen, San Diego, CA (US);
Dexu Lin, San Diego, CA (US);
Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 468 days.

(21) Appl. No.: 12/787,605

(22) Filed: May 26, 2010

(65) Prior Publication Data

US 2011/0128933 A1 Jun. 2, 2011

Related U.S. Application Data

(60) Provisional application No. 61/181,587, filed on May 27, 2009.

(51) Int. Cl.
*H04J 3/00* (2006.01)

(52) U.S. Cl.
USPC .......................................... 370/336; 370/338

(58) Field of Classification Search
USPC .......................................... 370/330, 336, 338
See application file for complete search history.

(56) References Cited

U.S. PATENT DOCUMENTS

| 2010/0172308 A1* | 7/2010 | Nam et al. .................... 370/329 |
| 2010/0195583 A1* | 8/2010 | Nory et al. .................... 370/329 |
| 2012/0063384 A1 | 3/2012 | Bi et al. |

FOREIGN PATENT DOCUMENTS

| CN | 101132204 A | 2/2008 |
| JP | 2008104184 A | 5/2008 |
| JP | 2012520585 A | 9/2012 |
| JP | 2012525032 A | 10/2012 |
| WO | WO-2010121826 A1 | 10/2010 |

OTHER PUBLICATIONS

3GPP TSG RAN WG1 Meeting #67, San Francisco, USA, May 4-8, 2009, R1092115.*
3GPP TSG RAN WG1 Meeting #57, San Francisco, USA, May 4-8, 2009, R1-091763.*
International Search Report and Written Opinion—PCT/US2010/036480, International Search Authority—European Patent Office—Sep. 23, 2010.

(Continued)

*Primary Examiner* — Sai-Ming Chan
(74) *Attorney, Agent, or Firm* — Michael J. DeHaemer, Jr.

(57) ABSTRACT

Aspects are disclosed for operating a relay via an MBSFN-based backhaul link. Control resources are allocated, which include a first set of control resources and a second set of control resources. For some embodiments, a portion of the first set of control resources is concatenated with a portion of the second set of control resources to form a concatenation of resources whereas, in other embodiments, an indication scheme is implemented to provide an indication of a first or second allocation size respectively associated with the first and second set of control resources. At least one control signal is then transmitted which includes at least one of the concatenation or the indication. Other disclosed embodiments are directed towards configuring a user equipment to decode a control signal generated according to the aspects disclosed herein.

87 Claims, 18 Drawing Sheets

(56) References Cited

OTHER PUBLICATIONS

LG Electronics: "Resource Allocation and Downlink Control Channel Structure for Relay Backhaul Link" 3GPP Draft; R1-092115 LGE_Backhaul Resource Allocation, 3rd Generation Partnership Project (3GPP), Mobile Competence Centre ; 650, Route Des Lucioles ; F-06921 Sophia-Antipolis Cedex ; France, No. San Francisco, USA; Apr. 28, 2009, XP050339560 [retrieved on Apr. 28, 2009] p. 2, figure 1.

Nokia Siemens Networks et al: "Control Channel for Relay Backhaul link" 3GPP Draft; R1-091763_Control_Relays_Backhaul, 3rd Generation Partnership Project (3GPP), Mobile Competence Centre ; 650, Route Des Lucioles ; F-06921 Sophia-Antipolis Cedex; France, No. San Francisco, USA; Apr. 28, 2009, XP050339287.

Research in Motion et al., "Relay Link HARQ Operation" Apr. 28, 2009, 3GPP Draft; R1-091784, 3rd Generation Partnership Project (3GPP), Mobile Competence Centre ; 650, Route Des Lucioles ; F-06921 Sophia-Antipolis Cedex ; France , XP050339305.

Nortel Networks, "Control Channel and Data Channel Design for Relay Link in LTE-Advanced", 3GPP TSG-RAN1 #55bis R1-090153, Jan. 16, 2009.

* cited by examiner

METHOD AND APPARATUS THAT FACILITATES OPERATING A RELAY VIA A MULTIMEDIA BROADCAST SINGLE FREQUENCY NETWORK BASED BACKHAUL LINK

CROSS-REFERENCE TO RELATED APPLICATIONS

This application claims the benefit of U.S. Provisional Patent Application Ser. No. 61/181,587 entitled "Enhanced MBSFN Based Backhaul Link for Relaying Operation in LTE-A," which was filed May 27, 2009. The aforementioned application is herein incorporated by reference in its entirety.

BACKGROUND

I. Field

The following description relates generally to wireless communications, and more particularly to methods and apparatuses that facilitate operating a relay via a Multimedia Broadcast Single Frequency Network based backhaul link.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

With respect to LTE-Advanced (LTE-A) systems, it is noted that an economically attractive option for LTE-A relays is the in-band half-duplex relay, which switches between transmitting (Tx) and receiving (Rx) for access and backhaul links on each frequency band. Multimedia Broadcast Single Frequency Network (MBSFN) sub-frames enable the relay half-duplex downlink operation, where a relay transmits common reference signals and control signals (e.g., PCFICH (Physical Control Format Indicator Channel), PHICH (Physical Hybrid Automatic Repeat Request Indicator Channel), and/or PDCCH (Physical Downlink Control Channel) grants for uplink data (both legacy and non-legacy UEs), as well as PDCCH grants for downlink data (non-legacy UEs)) on the first and possibly the second Orthogonal Frequency Division Multiplexing (OFDM) symbols on the downlink, then switches to receive the donor cell transmission for the rest of the sub-frame. However, operating such a relay within a macro/relay cell environment introduces several potential issues. For instance, within such environment, it may be difficult for a user equipment to distinguish control symbols intended for legacy user equipment from control symbols intended for non-legacy user equipment. A method and apparatus for efficiently operating a relay via an MBSFN-based backhaul link is thus desirable, which addresses at least this potential issue. Moreover, it would be desirable to provide a method and apparatus that facilitates having a relay node receive legacy control information from a donor cell, wherein the control information occupies an initial set of symbols which collide with a relay node is transmission.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with an enhanced MBSFN-based backhaul link. In one aspect, methods and computer program products are disclosed that facilitate operating a relay via an MBSFN-based backhaul link. These embodiments include allocating a first set of control resources and a second set of control resources within a sub-frame. These embodiments further include concatenating a first portion of control resources with a second portion of control resources to form a set of concatenated resources, wherein the first portion of control resources is associated with the first set of control resources, and wherein the second portion of control resources is associated with the second set of control resources. At least one control signal is then transmitted using a subset of the set of concatenated resources.

In another aspect, an apparatus configured to facilitate operating a relay via an MBSFN-based backhaul link is disclosed. Within such embodiment, the apparatus includes a processor configured to execute computer executable components stored in memory. The computer executable components include an allocation component, a concatenating component, a generation component, and a communication component. The allocation component is configured to allocate a first set of control resources and a second set of control resources within a sub-frame. The concatenating component is then configured to perform a concatenation of a first portion of control resources with a second portion of control resources to form a set of concatenated resources, wherein the first portion of control resources is associated with the first set of control resources, and wherein the second portion of control resources is associated with the second set of control resources. For this embodiment, the generation component is configured to generate at least one control signal, which includes a subset of the set of concatenated resources. The communication component is then configured to communicate the at least one control signal to a direct-link user equipment or a relay node.

In a further aspect, another apparatus is disclosed. Within such embodiment, the apparatus includes means for allocating, means for concatenating, and means for transmitting. For this embodiment, the means for allocating allocates a first set of control resources and a second set of control resources within a sub-frame. The means for concatenating then concatenate a first portion of control resources with a second portion of control resources to form a set of concatenated resources, wherein the first portion of control resources is associated with the first set of control resources, and wherein the second portion of control resources is associated with the second set of control resources. The means for transmitting then transmits at least one control signal using a subset of the set of concatenated resources.

In another aspect, other methods and computer program products are disclosed for operating a relay via an MBSFN-based backhaul link. For these embodiments, various acts are provided, including an act to allocate a first set of control resources and a second set of control resources associated with a Physical Hybrid Automatic Repeat Request Indicator Channel. These embodiments further include implementing an indication scheme that facilitates an indication of a first allocation size associated with the first set of control resources and a second allocation size associated with the second set of control resources. At least one control signal is then transmitted according to the indication scheme.

Another apparatus for operating a relay via an MBSFN-based backhaul link is also disclosed. Within such embodiment, the apparatus includes a processor configured to execute computer executable components stored in memory. The computer executable components include an allocation component, an indicator component, a generation component, and a communication component. The allocation component is configured to allocate a first set of control resources and a second set of control resources associated with a Physical Hybrid Automatic Repeat Request Indicator Channel. The indicator component is then configured to provide an indication of a first allocation size associated with the first set of control resources and a second allocation size associated with the second set of control resources. For this embodiment, the generation component is configured to generate at least one control signal, which includes the indication. The communication component is then configured to transmit the at least one control signal to a direct-link user equipment or a relay node.

In a further aspect, another apparatus is disclosed. Within such embodiment, the apparatus includes means for allocating, means for providing, and means for communicating. For this embodiment, the means for allocating allocates a first set of control resources and a second set of control resources associated with a Physical Hybrid Automatic Repeat Request Indicator Channel. The means for providing then provides an indication of a first allocation size associated with the first set of control resources and a second allocation size associated with the second set of control resources. The means for communicating then communicates at least one control signal, wherein the at least one control signal includes the indication.

In other aspects, methods and computer program products are disclosed for decoding a control signal. These embodiments include configuring a user equipment to implement a decoding scheme. A set of control symbols are then received, which include at least one of a first allocation set of control resources or a second set of control resources. The decoding scheme is then executed to decode at least one of a concatenation or an indication. For this embodiment, the concatenation concatenates a first portion of control resources with a second portion of control resources, wherein the first portion of control resources is associated with the first set of control resources, and wherein the second portion of control resources is associated with the second set of control resources. Meanwhile, the indication indicates a first allocation size associated with the first set of control resources and a second allocation size associated with the second set of control resources.

An apparatus configured to facilitate decoding a control signal is also disclosed. Within such embodiment, the apparatus includes a processor configured to execute computer executable components stored in memory. The computer executable components include a configuration component, a communication component, and a decoding component. The configuration component is configured to initialize a user equipment to implement a decoding scheme. The communication component is configured to receive a set of control symbols, which include at least one of a first set of control resources or a second set of control resources. The decoding component is then configured to ascertain at least one of a concatenation or an indication based on the decoding scheme. For this embodiment, the concatenation concatenates a first portion of control resources with a second portion of control resources, wherein the first portion of control resources is associated with the first set of control resources, and wherein the second portion of control resources is associated with the second set of control resources. Meanwhile, the indication indicates a first allocation size associated with the first set of control resources and a second allocation size associated with the second set of control resources.

In a further aspect, another apparatus is disclosed. Within such embodiment, the apparatus includes means for configuring, means for receiving, and means for determining. The means for configuring is provided to configure a user equipment to implement a decoding scheme. The means for receiving receives a set of control symbols, which include at least one of a first set of control resources or a second set of control resources. The means for determining is then a means for determining at least one of a concatenation or an indication according to the decoding scheme. For this embodiment, the concatenation concatenates a first portion of control resources with a second portion of control resources, wherein the first portion of control resources is associated with the first set of control resources, and wherein the second portion of control resources is associated with the second set of control resources. Meanwhile, the indication indicates a first allocation size associated with the first set of control resources and a second allocation size associated with the second set of control resources.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
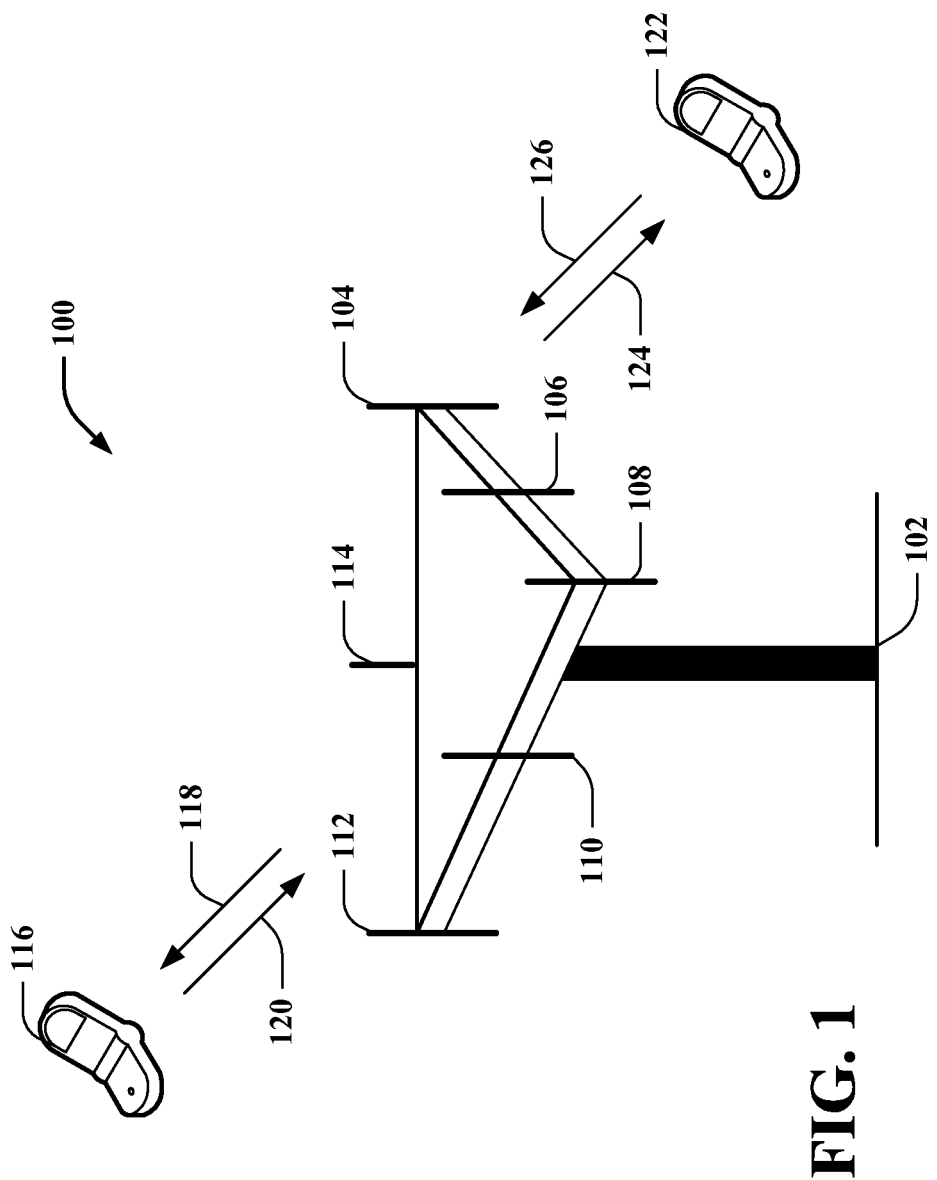
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The subject specification is directed towards facilitating operation of a relay via an MBSFN-based backhaul link. Moreover, exemplary embodiments are disclosed which address several potential issues associated with implementing an enhanced MBSFN-based relay backhaul link in LTE-A.

To this end, it is noted that the techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB), access point base station, or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
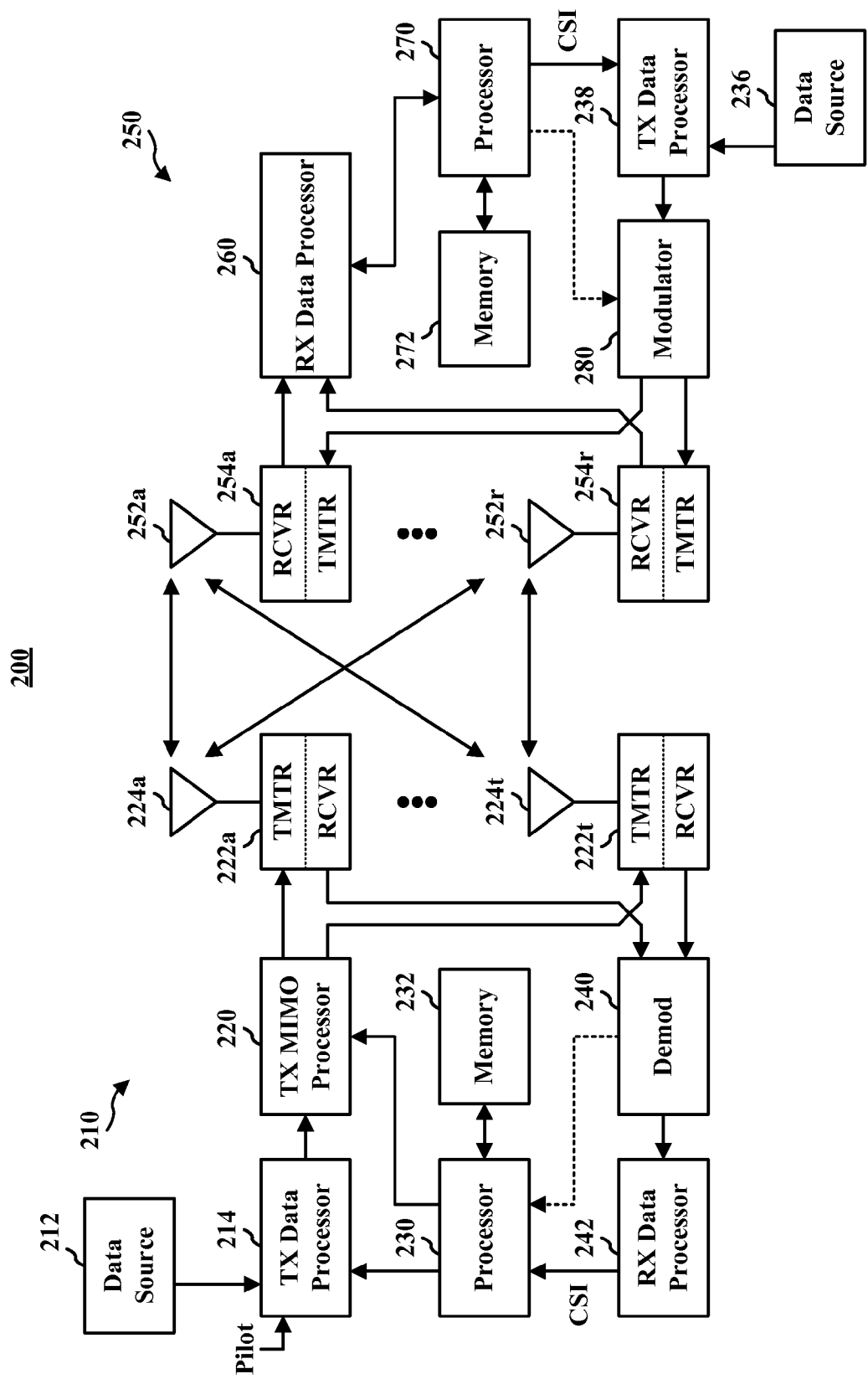
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
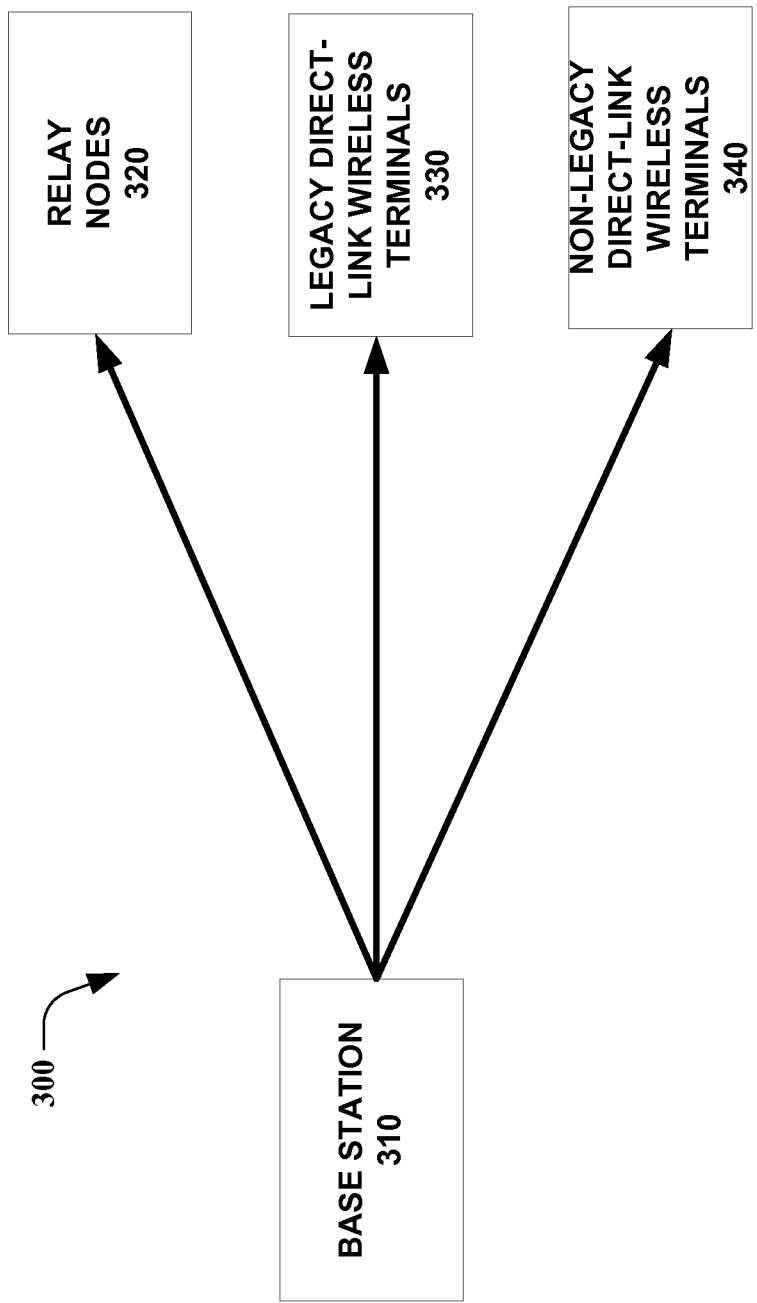
FIG. 3 is an illustration of an exemplary system that facilitates operating a relay via an MBSFN-based based backhaul link according to an embodiment.

Referring next to FIG. 3, an exemplary system that facilitates operating a relay via an MBSFN-based based backhaul link according to an embodiment is provided. As illustrated, system 300 includes base station 310 which is communicatively coupled to relay nodes 320, legacy direct-link wireless terminals 330 (e.g., LTE Release-8 UEs), and non-legacy wireless terminals 340 (e.g., LTE-A UEs, upcoming UEs, etc.). Within such embodiment, base station 310 generates control signals, which include resource allocations for either of relay nodes 320, legacy direct-link wireless terminals 330, and/or non-legacy wireless terminals 340. In an aspect, control symbols are concatenated and subsequently transmitted in a manner that is decodable by either of relay nodes 320, legacy direct-link wireless terminals 330, and/or non-legacy wireless terminals 340. In another aspect, an indication of the respective control region sizes is provided via the control signal in a manner that is also decodable by either of relay nodes 320, legacy direct-link wireless terminals 330, and/or non-legacy wireless terminals 340. A more detailed discussion of these and other exemplary embodiments is provided below.

As stated previously, an economically attractive option for LTE-A relays is the in-band half-duplex relay, which switches between Tx and Rx for access and backhaul links on each frequency band. In an aspect, MBSFN sub-frames facilitate relay half-duplex downlink operation, where a relay transmits common reference signals and control signals (e.g., PCFICH, PHICH, and/or PDCCH grants for uplink data (both legacy and non-legacy UEs), as well as PDCCH grants for downlink data (non-legacy UEs)) on the first and possibly the second OFDM symbols on the downlink, then switches to receive the donor cell transmission for the rest of the sub-frame.

However, a typical MBSFN configuration restricts sub-frames 0, 4, 5 and 9 to be non-MBSFN sub-frames. This restriction implies that a relay node could use at most six out of ten downlink sub-frames for backhaul communications. In addition, relaying nodes use MBSFN sub-frames for the backhaul link, and a relaying node will not serve relaying UEs (e.g., access link is off). Furthermore, for one or two Tx antenna ports, at least one OFDM symbol (e.g., up to two symbols) is transmitted by the relaying node in its MBSFN sub-frames, while for four Tx antenna ports, a fixed two symbols are transmitted. Due to the half-duplex nature of the relaying nodes, when transmitting, relaying nodes cannot receive control information in the first and/or second control symbols from the macro cell, (as discussed below with respect to FIG. 4) for the normal cyclic prefix (CP) case. The extension to the extended CP case is also contemplated.

Figure 4:
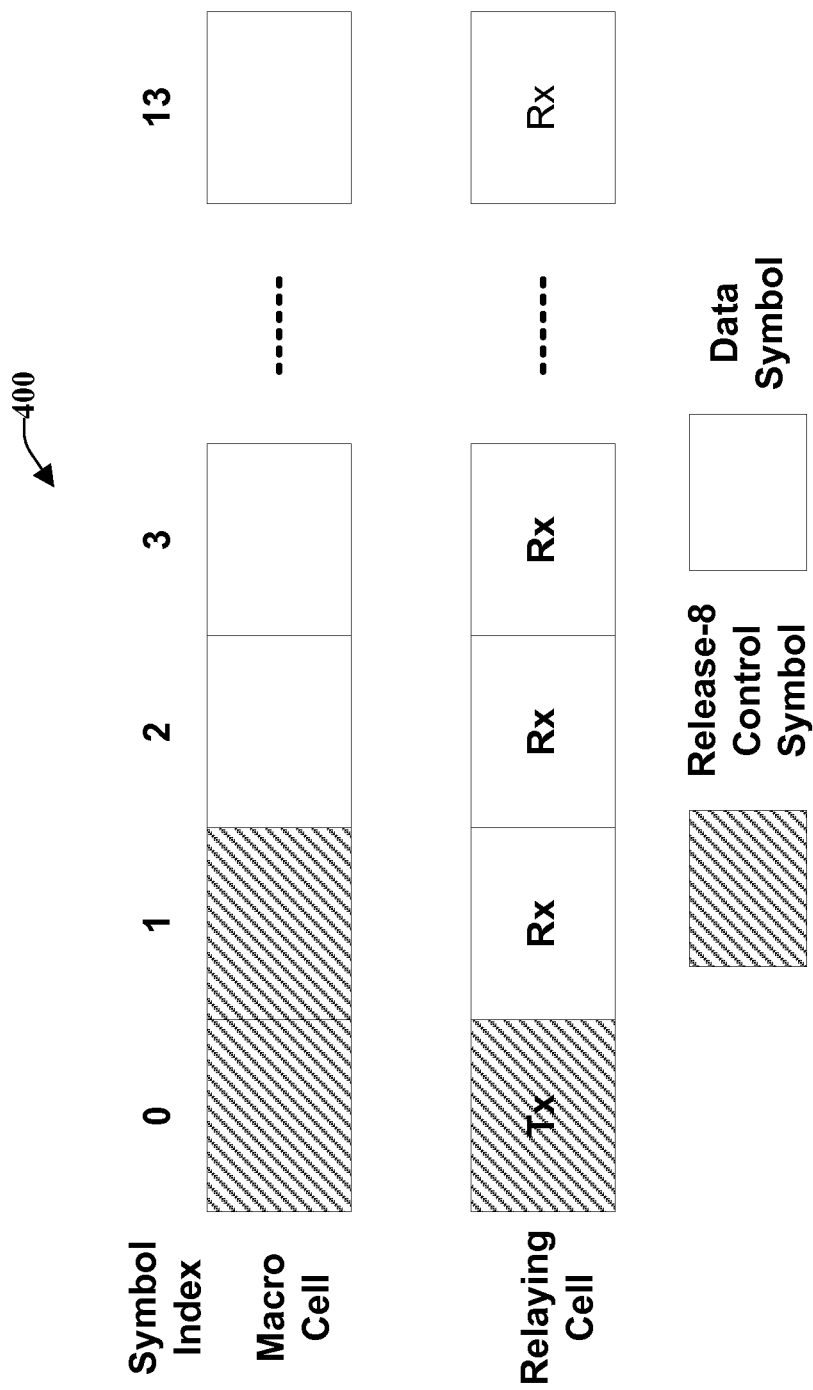
FIG. 4 is an illustration of an exemplary set of control symbols in a macro cell and a relaying cell.

Turning now to FIG. 4, an illustration of an exemplary set of control symbols in a macro cell and a relaying cell is provided. Here, the set of control symbols 400 illustrate a particular control channel issue in the relaying backhaul, assuming two control symbols configured in the macro cell, and one control symbol configured in the relaying cell. As can be seen, the relaying node misses the control information in the first control symbol from the macro cell, and hence misses the entire control information in the first two control symbols from the macro cell. As a consequence, the first two symbols in the relaying cell become effectively useless.

Proposed in this specification are at least two possible steps to mitigate the issue discussed above. First, the number of control symbols in the relaying nodes can be minimized. For example, one control symbol for one and two Tx antenna ports, and two control symbols for four Tx antenna ports. Second, the number of control symbols in the macro cell can be aligned with the control symbols in the relaying nodes.

Figure 5:
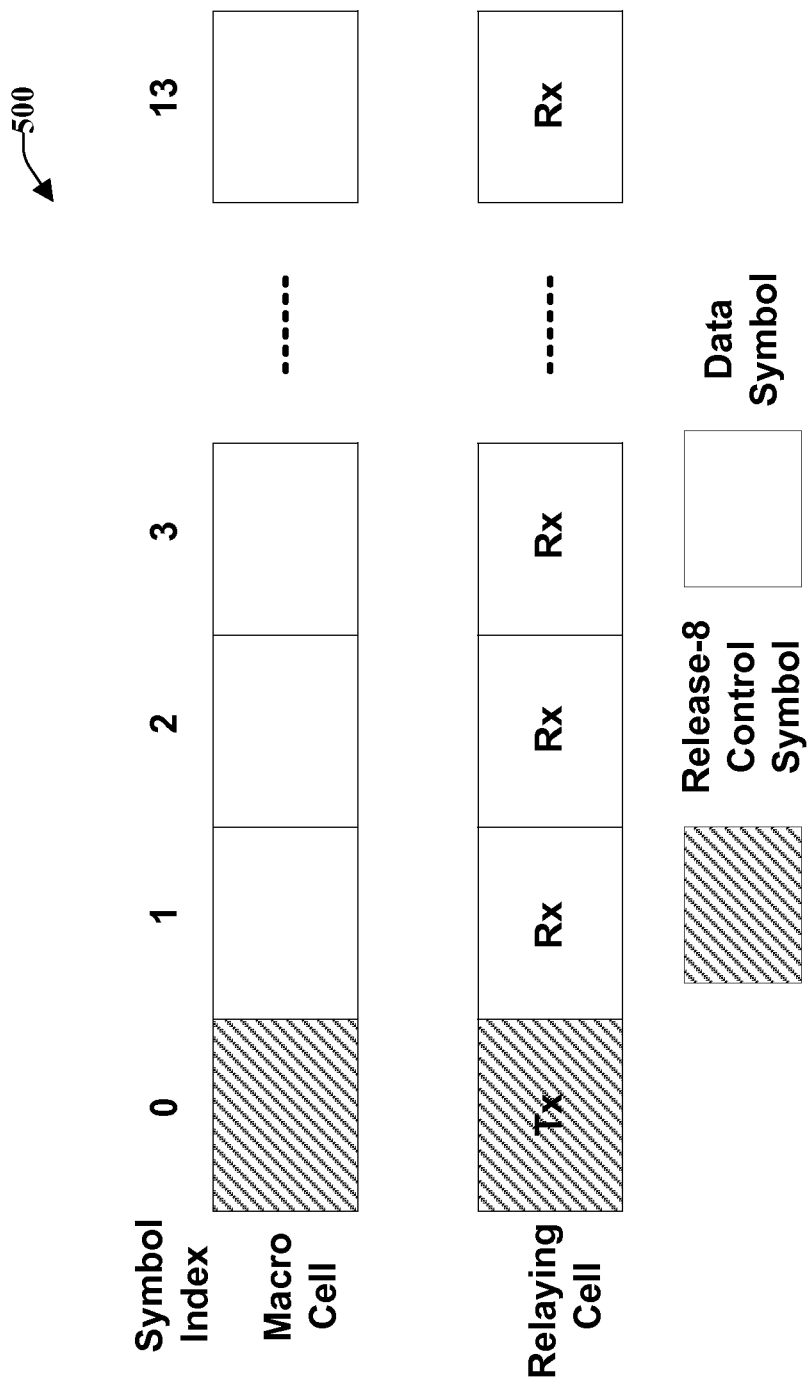
FIG. 5 is an illustration of an exemplary alignment of control symbols in a macro cell and a relaying cell.
Figure 6:
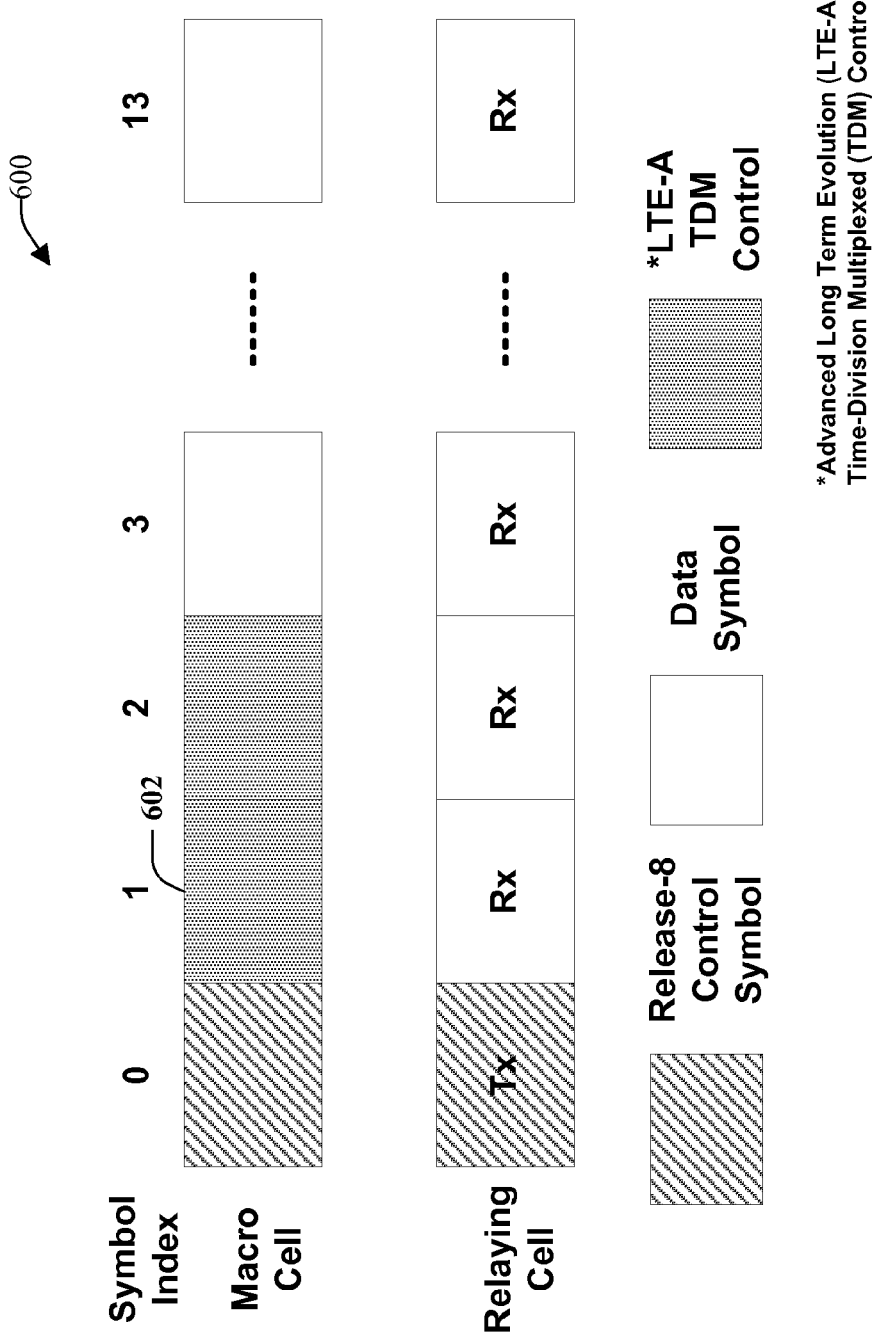
FIG. 6 is an exemplary illustration of control symbols that facilitate serving relay nodes and/or direct-link user equipment via time-division multiplexing according to an embodiment.
Figure 7:
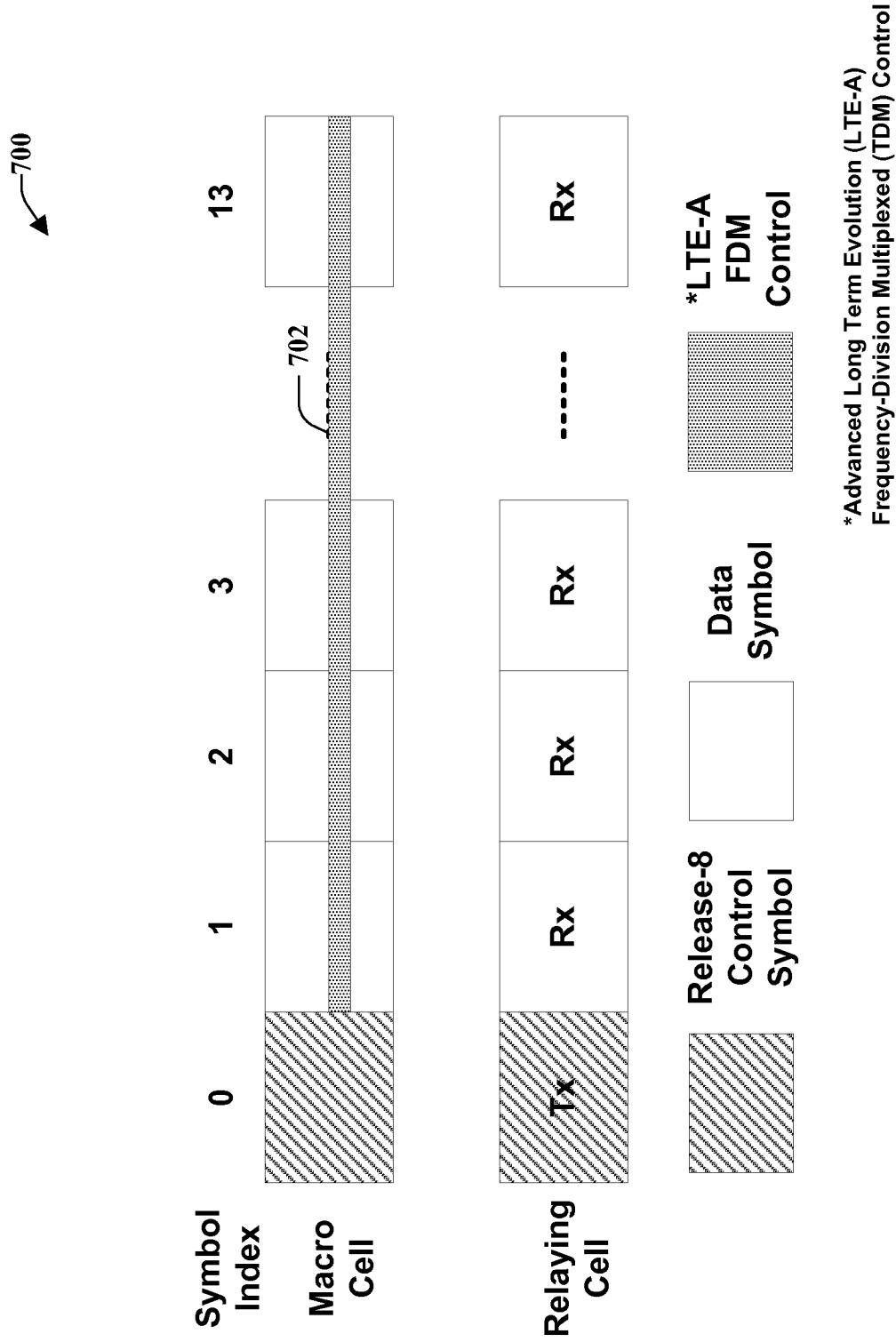
FIG. 7 is an exemplary illustration of control symbols that facilitate serving relay nodes and/or direct-link user equipment via frequency-division multiplexing according to an embodiment.

Referring next to FIG. 5, an illustration of an exemplary alignment of control symbols is provided, wherein the switching time from Tx to Rx at the relaying nodes is assumed to be negligible. Moreover, a set of control symbols 500 are aligned in the macro cell and relaying nodes as discussed previously. Within such embodiment, the relaying node misses the control information in the first control symbol from macro cell. However, it is noted that the first control symbol in the macro cell can only serve direct-link UEs. For this embodiment, in order to serve the relaying nodes, the macro cell thus has to have LTE-A control channels in the remaining symbols, either in a time-division multiplexed (TDM) fashion as in Release-8, in a frequency-division multiplexed (FDM) fashion, or a combination thereof. To this end, FIGS. 6 and 7 provide exemplary illustrations of control symbols 602 and 702 that facilitate serving relay nodes and/or direct-link user equipment via TDM and FDM, respectively.

Several potential issues and proposed solutions are now contemplated. It is noted that the first several control symbols (e.g., in LTE Release-8, up to three symbols for system bandwidth greater than ten resource blocks; up to four symbols otherwise) in the macro cell can only serve direct link UEs. In such symbols, the Physical Control Format Indicator Channel (PCFICH) needs to be transmitted, along with the common reference signal (CRS), and Physical Hybrid Automatic Repeat Request Indicator Channel (PHICH) (e.g., with a minimum resource allocation such as Ng=⅙). The Physical Downlink Control Channel (PDCCH) can also be transmitted to serve direct link UEs. Regardless of FDM/TDM structure, LTE-A control should carry at least PDCCH. The PDCCH can serve both relaying nodes and direct link UEs. PCFICH (TDM) or PCFICH equivalent information (FDM, e.g., number of resource blocks used for control, potentially locations of the resource blocks) and/or PHICH can be transmitted by the LTE-A control information as well. Again, this PCFICH/PHICH information can be intended for relaying nodes, direct link UEs, or both.

In Release-8, in order to decode PDCCH, it can be necessary to know the amount of resources reserved for PHICH. Consequently, PHICH information has to be known or detected before PDCCH detection. This is typically why PHICH information is a carrier in Physical Broadcast Channel (PBCH). In LTE-A, regardless of TDM or FDM control structure, it is desirable to multiplex PHICH and PDCCH in one symbol or one resource block, if LTE-A PHICH is supported. However, this creates a situation where two sets of PHICH information need to be transmitted beforehand.

Several possible solutions for providing the aforementioned information are contemplated. For example, in Release-8, control symbol are hard-coded (e.g., Ng=⅙ or 0), wherein the Ng in PBCH indicates the Ng for the LTE-A control. The Ng could also implicitly indicate the total number of resource blocks used for LTE-A control in case of FDM control structure. Additionally or alternatively, PBCH can indicate Ng for both the Release-8 and LTE-A control (e.g., always enforce the same Ng value for Release-8 and LTE-A), or new bits can be introduced to indicate the LTE-A Ng value.

Furthermore, an additional consideration is for PHICH design. Since both Release-8 and LTE-A include PHICH, it is desirable to implement a scheme for direct link UEs to effectively obtain PHICH information. In an aspect, Release-8 and LTE-A PHICH resources are logically concatenated for the actual PHICH resource index mapping based on the lowest physical resource block for the actual Physical Uplink Shared Channel (PUSCH) transmission.

Another consideration is with regards to Physical Uplink Control Channel (PUCCH) design. More specifically, design considerations are contemplated for deriving Acknowledgment/Negative Acknowledgment resources based on a minimum control channel element (CCE) in PDCCH. In an aspect, this can be accomplished by logically concatenating Release-8 and LTE-A PDCCH resources for the actual PUCCH resource index mapping.

Moreover, in Release-8, it is noted that PDCCH detection is organized in terms of search space and aggregation levels. With respect to aggregation levels, it is noted that there are four possible aggregation levels, 1, 2, 4, or 8 CCEs (wherein each CCE consumes 36 resource elements). The search space follows a tree structure, wherein the decoding candidates for an aggregation level L always have a starting CCE which is an integer multiple of L.

It is further noted that there are two types of search spaces: common and UE-specific. The common search space may have aggregation levels 4 and 8, while UE-specific may have 1, 2, 4 and 8. The number of decoding candidates per search space and aggregation level is as follows: $\{4, 2\}$ for levels $\{4, 8\}$ in the common search space, and $\{6, 6, 2, 2\}$ in the UE-specific search space. However, the available resources for PDCCH for direct link UEs are split into two parts: the Release-8 part (e.g., the first and/or second control symbol), and the LTE-A part (e.g., TDM or FDM structure). It would be inefficient if such static partitioning is enforced. In any case, a question remains as to how to still obtain the $\{4, 2\}$, $\{6, 6, 2, 2\}$ decoding candidates for direct link UEs.

A first option disclosed herein includes logically concatenating Release-8 and LTE-A PDCCH resources. Additionally or alternatively, a solution is set forth that logically concatenates Release-8 and LTE-A PDCCH resources, but respects the aforementioned tree structure. For example, the concatenation could be dependent on PDCCH aggregation levels such that the tree structure can be maintained. In a particular example, if there are N1 CCEs in the Release-8 control region, and N2 CCEs in the LTE-A control region, in order to observe the tree structure, the number of CCEs for each aggregation level L would be: floor(N1/L)+floor(N2/L), where L=1, 2, 4, 8.

Figure 8:
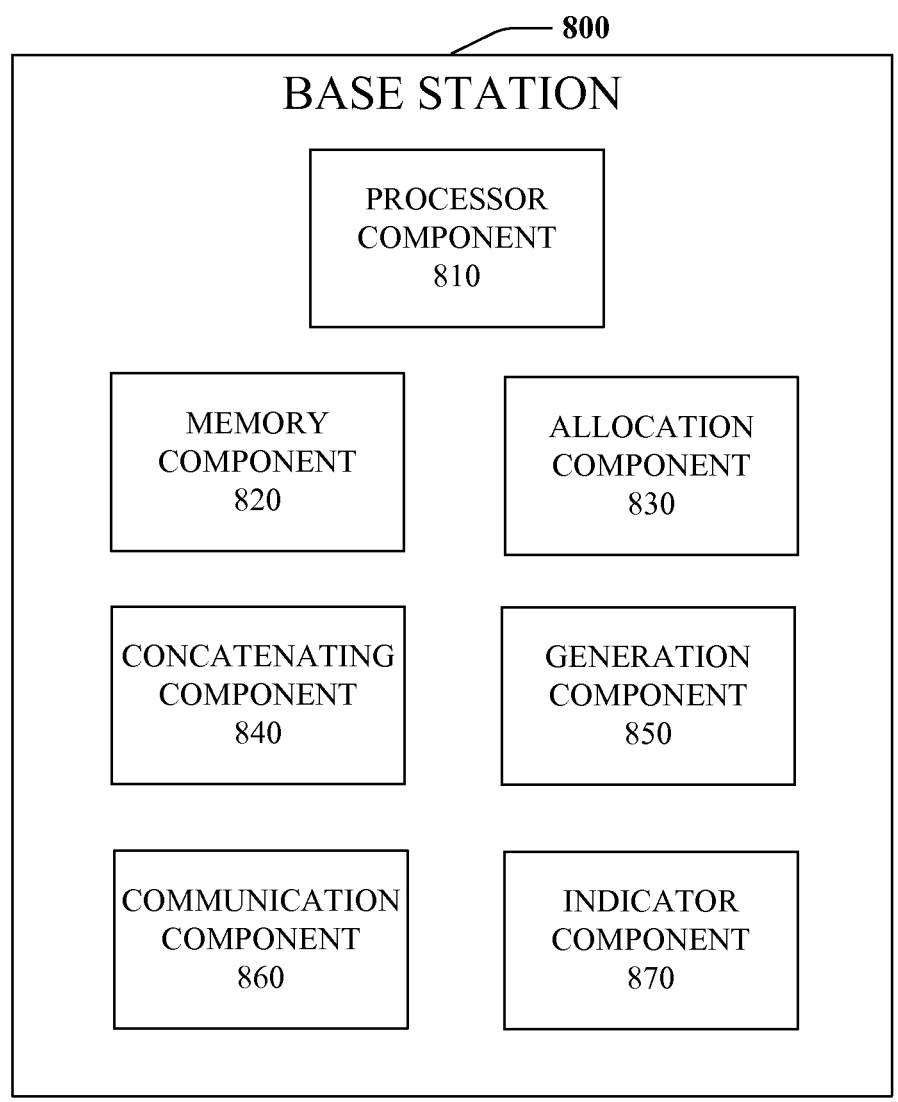
FIG. 8 illustrates a block diagram of an exemplary base station that facilitates operating a relay via an MBSFN-based based backhaul link in accordance with an aspect of the subject specification.

Referring next to FIG. 8, a block diagram of an exemplary base station that facilitates operating a relay via an MBSFN-based backhaul link according to an embodiment is provided. As shown, base station 800 may include processor component 810, memory component 820, allocation component 830, concatenating component 840, indicator component 850, generation component 860, and communication component 870.

In one aspect, processor component 810 is configured to execute computer-readable instructions related to performing any of a plurality of functions. Processor component 810 can be a single processor or a plurality of processors dedicated to analyzing information to be communicated from base station 800 and/or generating information that can be utilized by memory component 820, allocation component 830, concatenating component 840, indicator component 850, generation component 860, and/or communication component 870. Additionally or alternatively, processor component 810 may be configured to control one or more components of base station 800.

In another aspect, memory component 820 is coupled to processor component 810 and configured to store computer-readable instructions executed by processor component 810. Memory component 820 may also be configured to store any of a plurality of other types of data including generated by any of allocation component 830, concatenating component 840, indicator component 850, generation component 860, and/or communication component 870. Memory component 820 can be configured in a number of different configurations, including as random access memory, battery-backed memory, hard disk, magnetic tape, etc. Various features can also be implemented upon memory component 820, such as compression and automatic back up (e.g., use of a Redundant Array of Independent Drives configuration).

As illustrated, base station 800 may also include allocation component 830. Within such embodiment, allocation component 830 is configured to allocate a first set of control resources and a second set of control resources within a sub-frame. In an aspect, either of the first or second set of control resources can be associated with a Physical Hybrid Automatic Repeat Request Indicator Channel. In another aspect, the first set of control resources is within a legacy control region, whereas the second set of control resources is within a non-legacy control region.

In another aspect, base station 800 may further include concatenating component 840, which is configured to perform a concatenation of a first portion of control resources with a second portion of control resources to form a set of concatenated resources. Here, the first portion can be associated with a legacy user equipment (e.g., a Release-8 UE), whereas the second portion can be associated with a non-legacy user equipment (e.g., LTE-A UEs, upcoming UEs, etc.). In a particular embodiment, concatenating component 840 is further configured to ascertain a Hybrid Automatic Repeat Request resource, based on a subset of the set of concatenated resources, for a Physical Downlink Shared Channel transmission associated with a non-legacy user.

Base station 800 may also include indicator component 850, which is configured to provide an indication of a first allocation size associated with the first set of control resources and a second allocation size associated with the second set of control resources. Here, the first allocation size can be associated with a non-legacy user equipment (e.g., LTE-A UEs, upcoming UEs, etc.), whereas the second allocation size can be associated with a legacy user equipment (e.g., a Release-8 UE). To this end, it should be noted that indicator component 850 can be configured to implement any of a plurality of indication schemes. For instance, in an exemplary embodiment, indicator component 850 is further configured to introduce a new set of bits in a Physical Broadcast Channel, wherein the introducing operation indicates the first allocation size. In another exemplary embodiment, indicator component 850 is further configured to indicate the first allocation size via a Physical Broadcast Channel, and to hard-code the second allocation size into the at least one control signal. In a further exemplary embodiment, indicator component 850 is further configured to make the first allocation size equal to the second allocation size, wherein the indication is communicated via a Physical Broadcast Channel. In yet another exemplary embodiment, indicator component 850 is further configured to indicate at least one of the first allocation size or the second allocation size via a layer three configuration.

As illustrated, base station 800 may also include generation component 860. Within such embodiment, generation component 860 is configured to generate at least one control signal, which includes at least one of the first set of control resources or the second set of control resources. Here, it should be noted that generation component 860 may be configured to generate any of various types of control signals, wherein concatenating component 840 is then used for ascertaining various types of resources utilized in the concatenation process. For instance, in a first aspect, the at least one control signal is a Physical Hybrid Automatic Repeat Request Indicator Channel. For this embodiment, concatenating component 840 may be further configured to ascertain a Hybrid Automatic Repeat Request resource for an actual Physical Uplink Shared Channel transmission within the subset of the set of concatenated resources based on a lowest physical resource block of the actual Physical Uplink Shared Channel transmission. In a second aspect, the at least one control signal is a Physical Downlink Control Channel. For this embodiment, concatenating component 840 may be further configured to ascertain a set of Physical Downlink Control Channel decoding candidates within the subset of the set of concatenated resources for an aggregation level associated with a non-legacy user equipment. The concatenation could then be based on the aggregation level.

In yet another aspect, base station 800 includes communication component 870, which is coupled to processor component 810 and configured to interface base station 800 with external entities. For instance, communication component 870 may be configured to communicate the at least one control signal to a direct-link user equipment or a relay node. In as aspect, it should be noted that communication component 870 can be further configured to transmit a first control signal and a second control signal, wherein the first control signal includes at least the first set of control resources, and wherein the second control signal includes the first set of control resources and the second set of control resources. In a first aspect, generation component 860 may be configured to exclude control resources via an excluding operation, wherein the second set of control resources is excluded from the first control signal, and wherein communication component 870 is configured to transmit the first control signal to a legacy user equipment. In another aspect, communication component 870 is configured to transmit the second control signal to either a non-legacy user equipment or a relay node.

It should be further noted that communication component 870 may be configured to provide control data in any of a plurality of formats. For instance, in an aspect, communication component 870 is configured to provide a legacy control region in a time-division multiplexed format, wherein the legacy control region includes up to two Orthogonal Frequency Division Multiplexing symbols. In another aspect, communication component 870 is configured to provide a non-legacy control region in either a time-division multiplexed format, a frequency-division multiplexed format, and/or a format that combines a frequency-division multiplexed format and a time-division multiplexed format.

Figure 9:
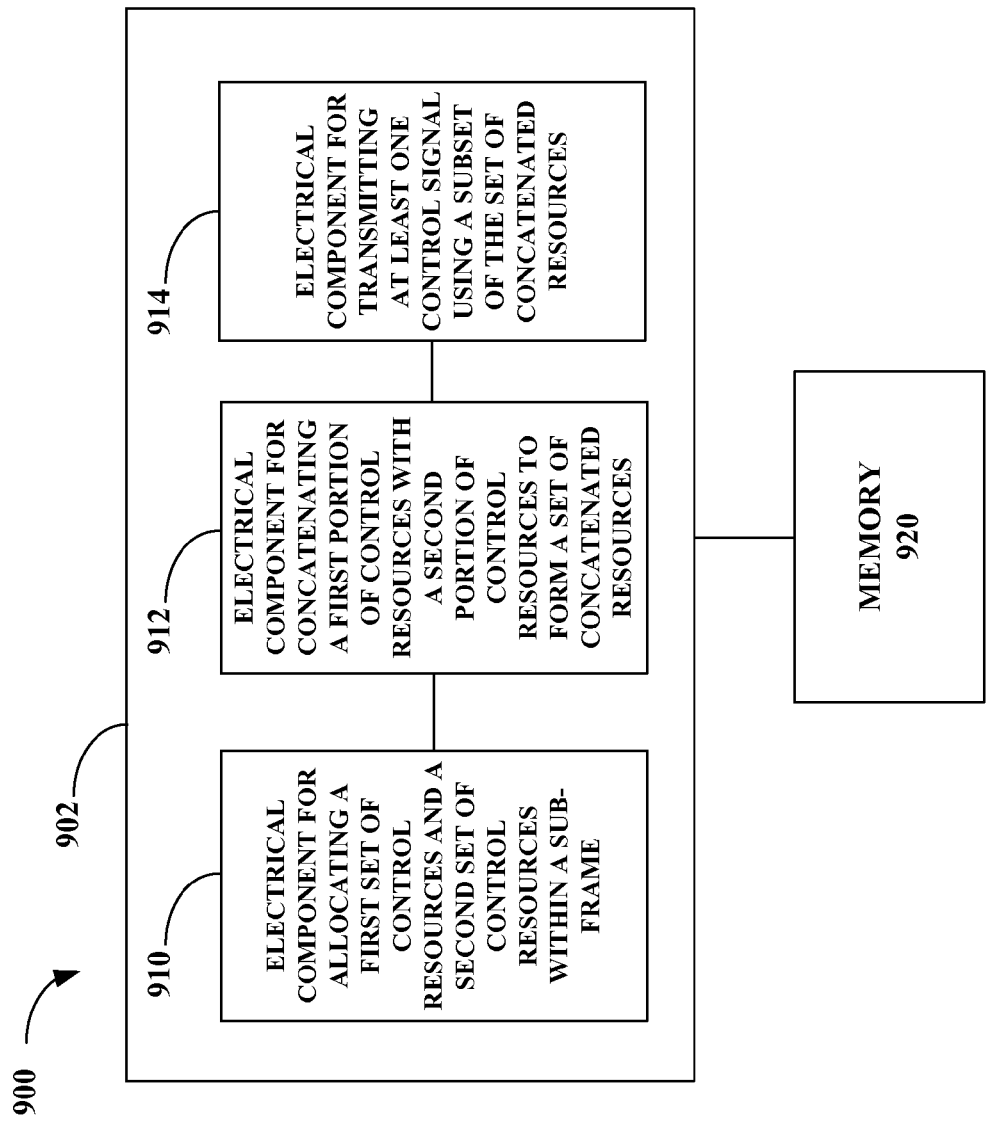
FIG. 9 is an illustration of a first exemplary coupling of electrical components that effectuate operating a relay via an MBSFN-based based backhaul link.

Turning to FIG. 9, illustrated is a system 900 that facilitates operating a relay via an MBSFN-based backhaul link according to an embodiment. System 900 and/or instructions for implementing system 900 can reside within a network entity (e.g., base station 800) or a computer-readable storage medium, for instance. As depicted, system 900 includes functional blocks that can represent functions implemented by a processor, software, or combination thereof (e.g., firmware). System 900 includes a logical grouping 902 of electrical components that can act in conjunction. As illustrated, logical grouping 902 can include an electrical component for allocating a first set of control resources and a second set of control resources within a sub-frame 910. Logical grouping 902 can also include an electrical component for concatenating a first portion of control resources with a second portion of control resources to form a set of concatenated resources 912. Further, logical grouping 902 can include an electrical component for transmitting at least one control signal using a subset of the set of concatenated resources 914. Additionally, system 900 can include a memory 920 that retains instructions for executing functions associated with electrical components 910, 912, and 914, wherein any of electrical components 910, 912, and 914 can exist either within or outside memory 920.

Figure 10:
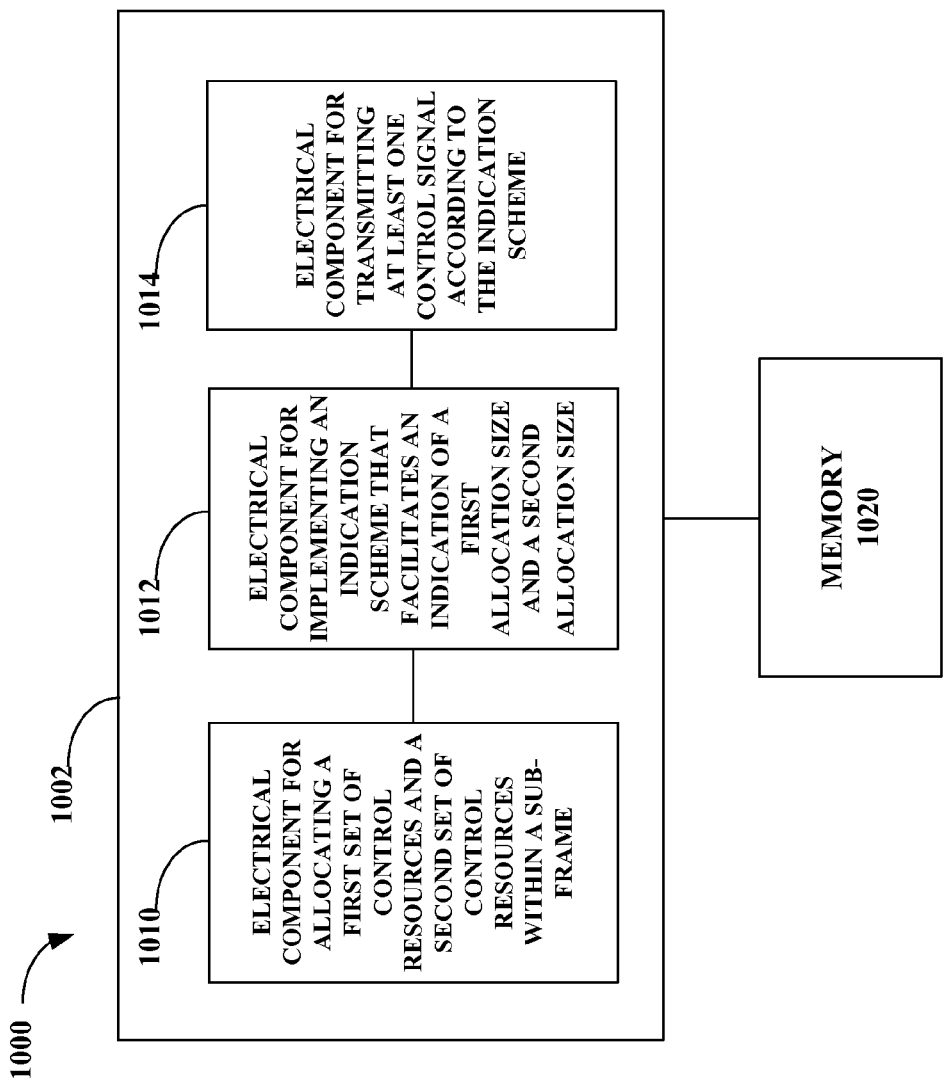
FIG. 10 is an illustration of a second exemplary coupling of electrical components that effectuate operating a relay via an MBSFN-based based backhaul link.

Referring next to FIG. 10, illustrated is another system 1000 that facilitates operating a relay via an MBSFN-based backhaul link according to an embodiment. System 1000 and/or instructions for implementing system 1000 can also reside within a network entity (e.g., base station 800) or a computer-readable storage medium, for instance, wherein system 1000 includes functional blocks that can represent functions implemented by a processor, software, or combination thereof (e.g., firmware). Moreover, system 1000 includes a logical grouping 1002 of electrical components that can act in conjunction similar to logical grouping 902 in system 900. As illustrated, logical grouping 1002 can include an electrical component for allocating a first set of control resources and a second set of control resources within a sub-frame 1010. Logical grouping 1002 can also include an electrical component for implementing an indication scheme that facilitates an indication of a first allocation size and a second allocation size 1012. Further, logical grouping 1002 can include an electrical component for transmitting at least one control signal according to the indication scheme 1014.

Additionally, system 1000 can include a memory 1020 that retains instructions for executing functions associated with electrical components 1010, 1012, and 1014. While shown as being external to memory 1020, it is to be understood that electrical components 1010, 1012, and 1014 can exist within memory 1020.

Figure 11:
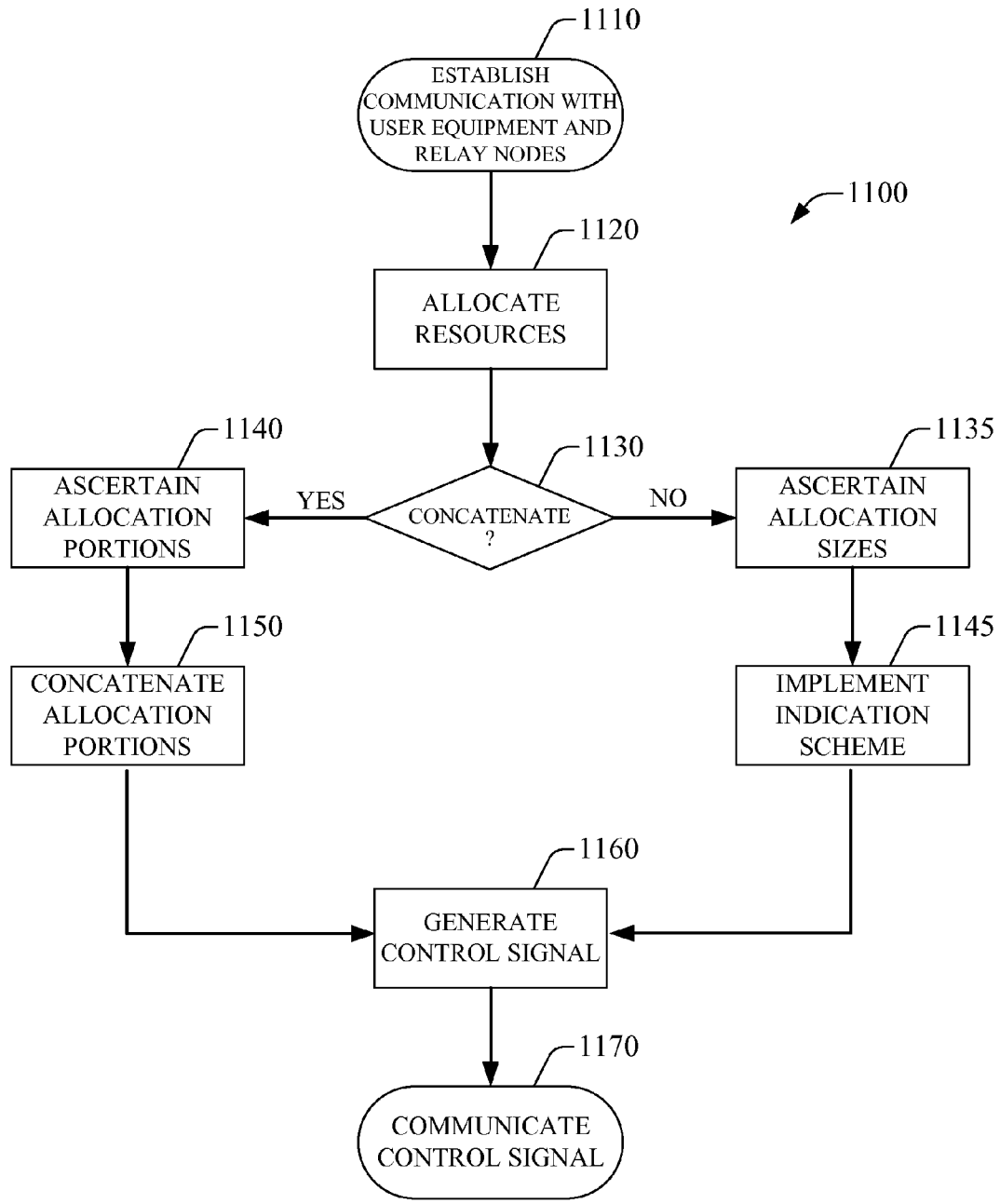
FIG. 11 is a flow chart illustrating an exemplary methodology for facilitating operating a relay via an MBSFN-based based backhaul link in accordance with an aspect of the subject specification.

Referring next to FIG. 11, a flow chart illustrating an exemplary method for facilitating operating a relay via an MBSFN-based backhaul link is provided. As illustrated, process 1100 includes a series of acts that may be performed by various components of a network entity (e.g., base station 800) according to an aspect of the subject specification. Process 1100 may be implemented by employing at least one processor to execute computer executable instructions stored on a computer readable storage medium to implement the series of acts. In another embodiment, a computer-readable storage medium comprising code for causing at least one computer to implement the acts of process 1100 are contemplated.

In an aspect, process 1100 begins with a communication being established with relay nodes and direct-link UEs at act 1110. In an aspect, the direct-link UEs may include legacy UEs (e.g., Release-8 UEs) and/or non-legacy UEs (e.g., LTE-A UEs, upcoming UEs, etc.).

Next, at act 1120, resources are allocated according to the particular entities being served. At any given time, such entities may include any of a plurality of direct-link UEs and/or relay nodes, wherein a first set of control resources and a second set of control resources are allocated. Once allocated, process 1100 then proceeds to act 1130 where the base station determines whether to concatenate portions of those resources or to implement an indication scheme to indicate particular allocation sizes.

If a concatenation-based algorithm is implemented, process 1100 proceeds to act 1140 where allocation portions are ascertained. In a particular embodiment, a first portion of control resources is associated with the first set of control resources, whereas a second portion of control resources is associated with the second set of control resources. Once ascertained, the allocation portions are then logically concatenated at act 1150. Next, at act 1160, a control signal is generated which includes a subset of the concatenated allocation portions, wherein the control signal is subsequently communicated at act 1170.

However, if a concatenation-based algorithm is not implemented, process 1100 may proceed to act 1135 where allocation sizes are ascertained. In a particular embodiment, a first allocation size of resources is associated with the first set of control resources, whereas a second allocation size of resources is associated with the second set of control resources. Once the allocation sizes are ascertained, an appropriate indication scheme for indicating the allocation sizes is implemented at act 1145. Next, at act 1160, a control signal is generated according to the indication scheme, wherein the control signal is subsequently communicated at act 1170.

Figure 12:
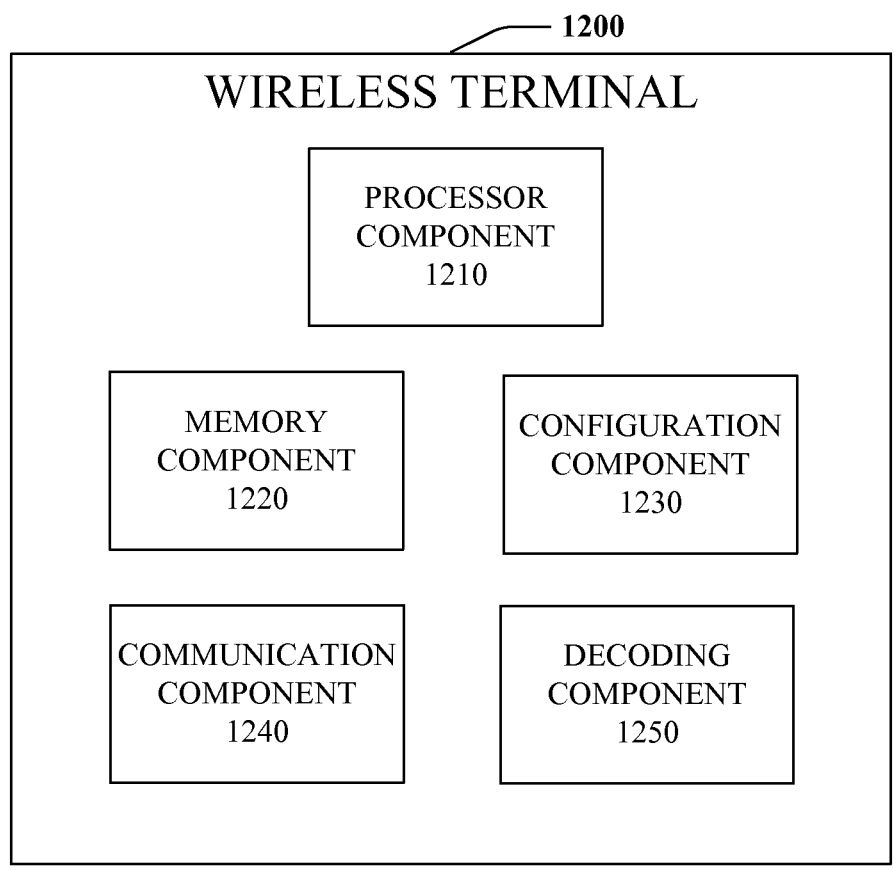
FIG. 12 illustrates a block diagram of an exemplary wireless terminal that facilitates decoding a control signal in accordance with an aspect of the subject specification.

Referring next to FIG. 12, a block diagram illustrates an exemplary wireless terminal that facilitates decoding a control signal in accordance with various aspects. As illustrated, wireless terminal 1200 may include processor component 1210, memory component 1220, configuration component 1230, communication component 1240, and decoding component 1250.

Similar to processor component 810 in base station 800, processor component 1210 is configured to execute computer-readable instructions related to performing any of a plurality of functions. Processor component 1210 can be a single processor or a plurality of processors dedicated to analyzing information to be communicated from wireless terminal 1200 and/or generating information that can be utilized by memory component 1220, configuration component 1230, communication component 1240, and/or decoding component 1250. Additionally or alternatively, processor component 1210 may be configured to control one or more components of wireless terminal 1200.

In another aspect, memory component 1220 is coupled to processor component 1210 and configured to store computer-readable instructions executed by processor component 1210. Memory component 1220 may also be configured to store any of a plurality of other types of data including data generated by any of configuration component 1230, communication component 1240, and/or decoding component 1250. Here, it should be noted that memory component 1220 is analogous to memory component 820 in base station 800. Accordingly, it should be appreciated that any of the aforementioned features/configurations of memory component 820 are also applicable to memory component 1220.

As illustrated, wireless terminal 1200 may also include configuration component 1230 and communication component 1240. Within such embodiment, configuration component 1230 is configured to initialize a user equipment to implement a decoding scheme, whereas communication component 1240 is configured to receive a set of control symbols. For this embodiment, the set of control symbols includes at least one of a first set of control resources or a second set of control resources.

Wireless terminal 1200 may further include decoding component 1250, which is configured to ascertain at least one of an indication or a concatenation based on the decoding scheme. With respect to the indication, it is noted that the indication indicates a first allocation size associated with the first set of control resources and a second allocation size associated with the second set of control resources. To this end, it is noted that decoding component 1250 can be configured to ascertain the first allocation size via a set of newly introduced bits in a Physical Broadcast Channel. Within such embodiment, the first allocation size can be associated with a non-legacy user equipment (e.g., LTE-A UEs, upcoming UEs, etc.). With respect to concatenation, decoding component 1250 may be configured to decode a concatenation of a first portion of control resources with a second portion of control resources, wherein the first portion is associated with the first set of control resources, and wherein the second portion is associated with the second set of control resources.

Figure 13:
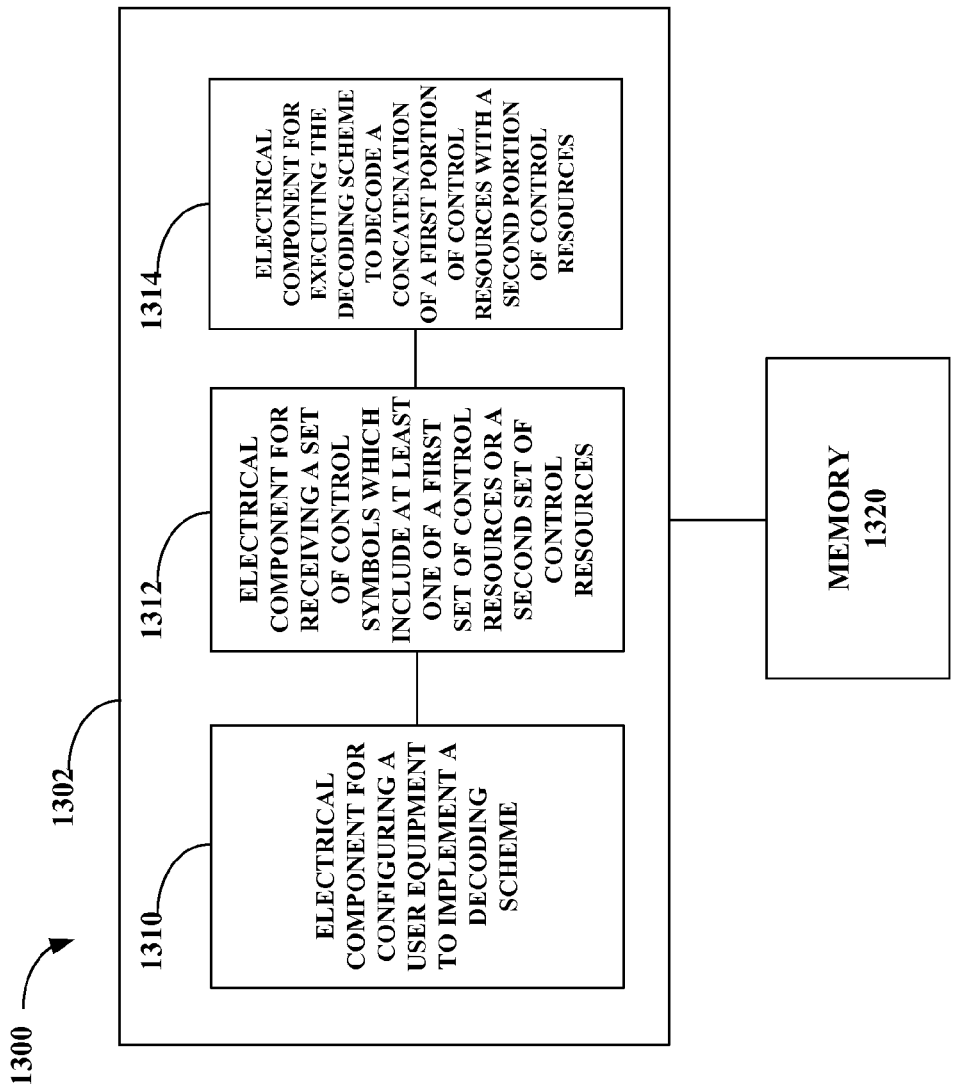
FIG. 13 is an illustration of a first exemplary coupling of electrical components that effectuate decoding a control signal.

Turning to FIG. 13, illustrated is a system 1300 that facilitates decoding a control signal according to an embodiment. System 1300 and/or instructions for implementing system 1300 can reside within a user equipment (e.g., wireless terminal 1200) or a computer-readable storage medium, for instance. As depicted, system 1300 includes functional blocks that can represent functions implemented by a processor, software, or combination thereof (e.g., firmware). System 1300 includes a logical grouping 1302 of electrical components that can act in conjunction. As illustrated, logical grouping 1302 can include an electrical component for configuring a user equipment to implement a decoding scheme 1310. Furthermore, logical grouping 1302 can include an electrical component for receiving a set of control symbols which include at least one of a first set of control resources or a second set of control resources 1312. Logical grouping 1302 can also include an electrical component for executing the decoding scheme to decode a concatenation of a first portion of control resources with a second portion of control resources 1314. Additionally, system 1300 can include a memory 1320 that retains instructions for executing functions associated with electrical components 1310, 1312, and 1314.

While shown as being external to memory 1320, it is to be understood that electrical components 1310, 1312, and 1314 can exist within memory 1320.

Figure 14:
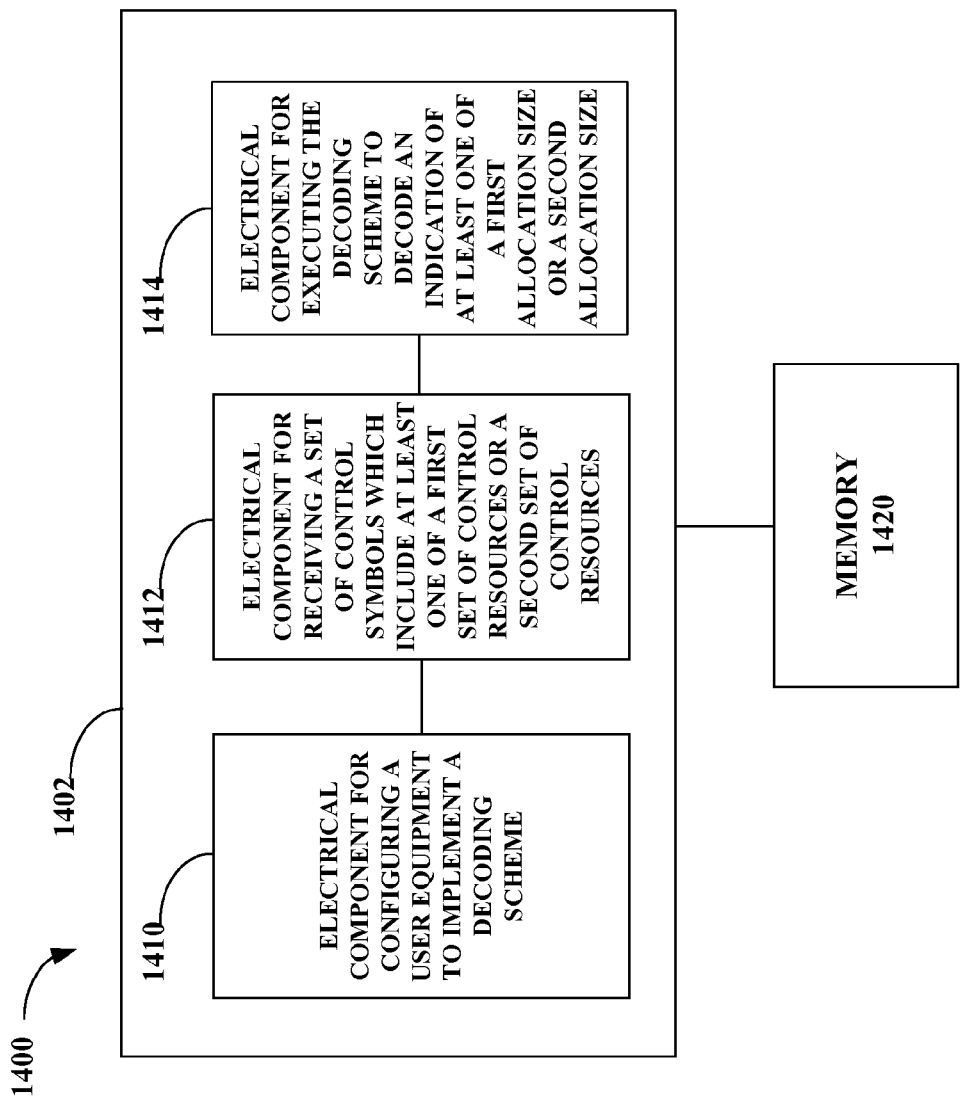
FIG. 14 is an illustration of a second exemplary coupling of electrical components that effectuate decoding a control signal.

Referring next to FIG. 14, illustrated is another system 1400 that facilitates decoding a control signal according to an embodiment. System 1400 and/or instructions for implementing system 1400 can also reside within a user equipment (e.g., wireless terminal 1200) or a computer-readable storage medium, for instance, wherein system 1400 includes functional blocks that can represent functions implemented by a processor, software, or combination thereof (e.g., firmware). Moreover, system 1400 includes a logical grouping 1402 of electrical components that can act in conjunction similar to logical grouping 1302 in system 1300. As illustrated, logical grouping 1402 can include an electrical component for configuring a user equipment to implement a decoding scheme 1410. Furthermore, logical grouping 1402 can include an electrical component for receiving a set of control symbols which include at least one of a first set of control resources or a second set of control resources 1412. Logical grouping 1402 can also include an electrical component for executing the decoding scheme to decode an indication of at least one of a first allocation size or a second allocation size 1414. Additionally, system 1400 can include a memory 1420 that retains instructions for executing functions associated with electrical components 1410, 1412, and 1414. While shown as being external to memory 1420, it is to be understood that electrical components 1410, 1412, and 1414 can exist within memory 1420.

Figure 15:
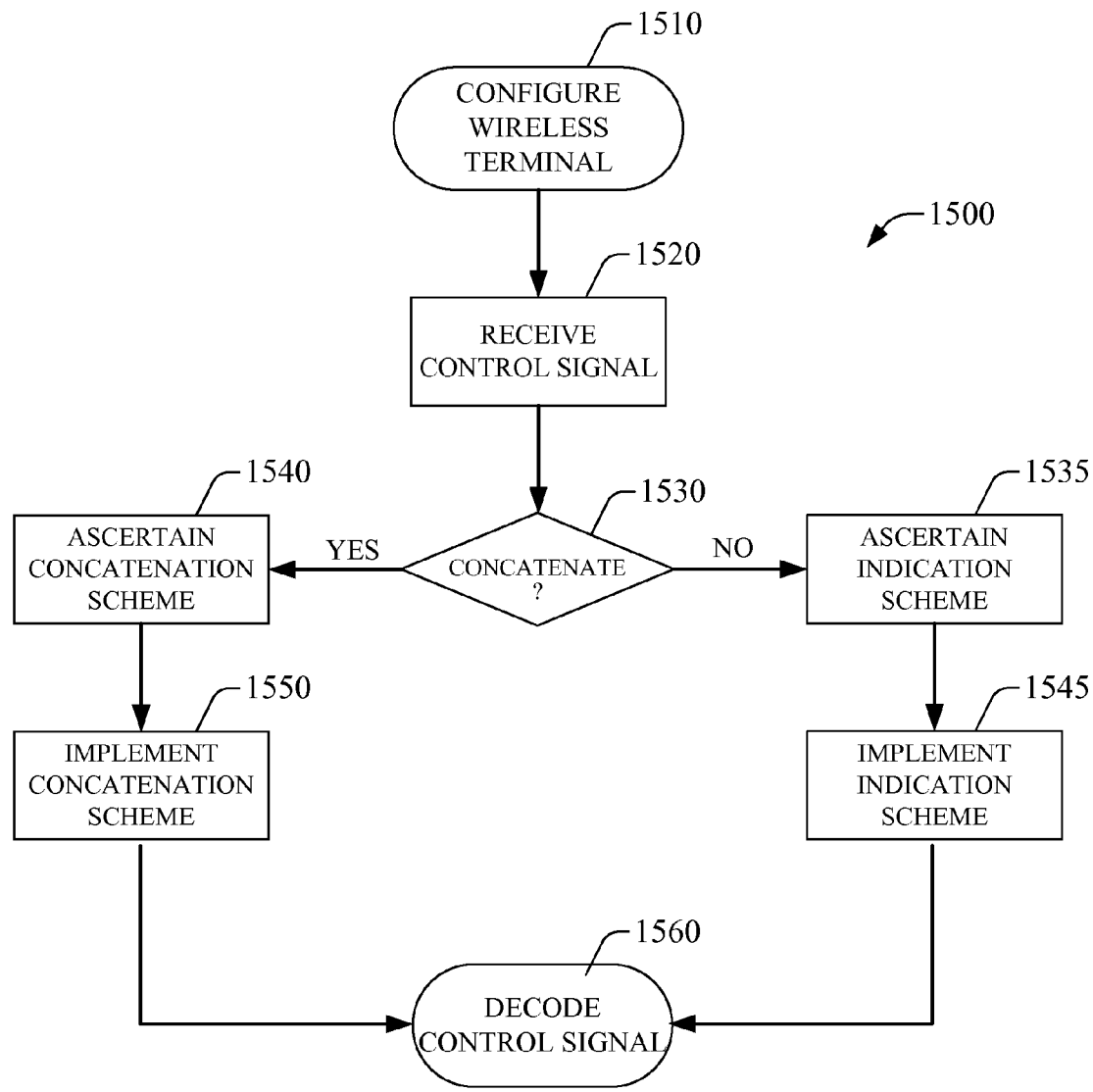
FIG. 15 is flow chart illustrating an exemplary methodology for decoding a control signal in accordance with an aspect of the subject specification.

Referring next to FIG. 15, a flow chart illustrating an exemplary method that facilitates decoding a control signal is provided. As illustrated, process 1500 includes a series of acts that may be performed by various components of a user equipment (e.g., wireless terminal 1200) according to an aspect of the subject specification. Process 1500 may be implemented by employing at least one processor to execute computer executable instructions stored on a computer readable storage medium to implement the series of acts. In another embodiment, a computer-readable storage medium comprising code for causing at least one computer to implement the acts of process 1500 are contemplated.

In an aspect, process 1500 begins with a wireless terminal being configured to decode control signals at act 1510. Here, it should be noted that the wireless terminal may be pre-configured and/or dynamically configured according to instructions received from a network entity. Once configured, the wireless terminal may process control signals, which are received at act 1520.

As stated previously, a network entity may implement any of a plurality of algorithms to facilitate operating a relay via an MBSFN-based based backhaul link. In an aspect, the configuration of the wireless terminal at act 1510 is in accordance with the particular algorithm implemented by the network entity, which may include concatenation-based algorithms, as well as algorithms in which allocation sizes are indicated based on a particularly implemented indication scheme. Accordingly, at act 1530, process 1500 may include a determination of whether a concatenation-based algorithm was implemented.

If a concatenation-based algorithm was indeed implemented, process 1500 proceeds to act 1540 where the particular concatenation scheme is ascertained. This particular concatenation scheme is then implemented at act 1550, and process 1500 then concludes with the control signal being decoded at act 1560 in accordance with the concatenation scheme.

However, if at act 1530, it is determined that a concatenation-based algorithm was not implemented, a particular indication-based scheme is ascertained at act 1535 to facilitate determining allocation sizes associated with the control signal. This particular indication scheme is then implemented at act 1545, and process 1500 then concludes with the control signal being decoded at act 1560 in accordance with the indication scheme.

Exemplary Communication System

Figure 16:
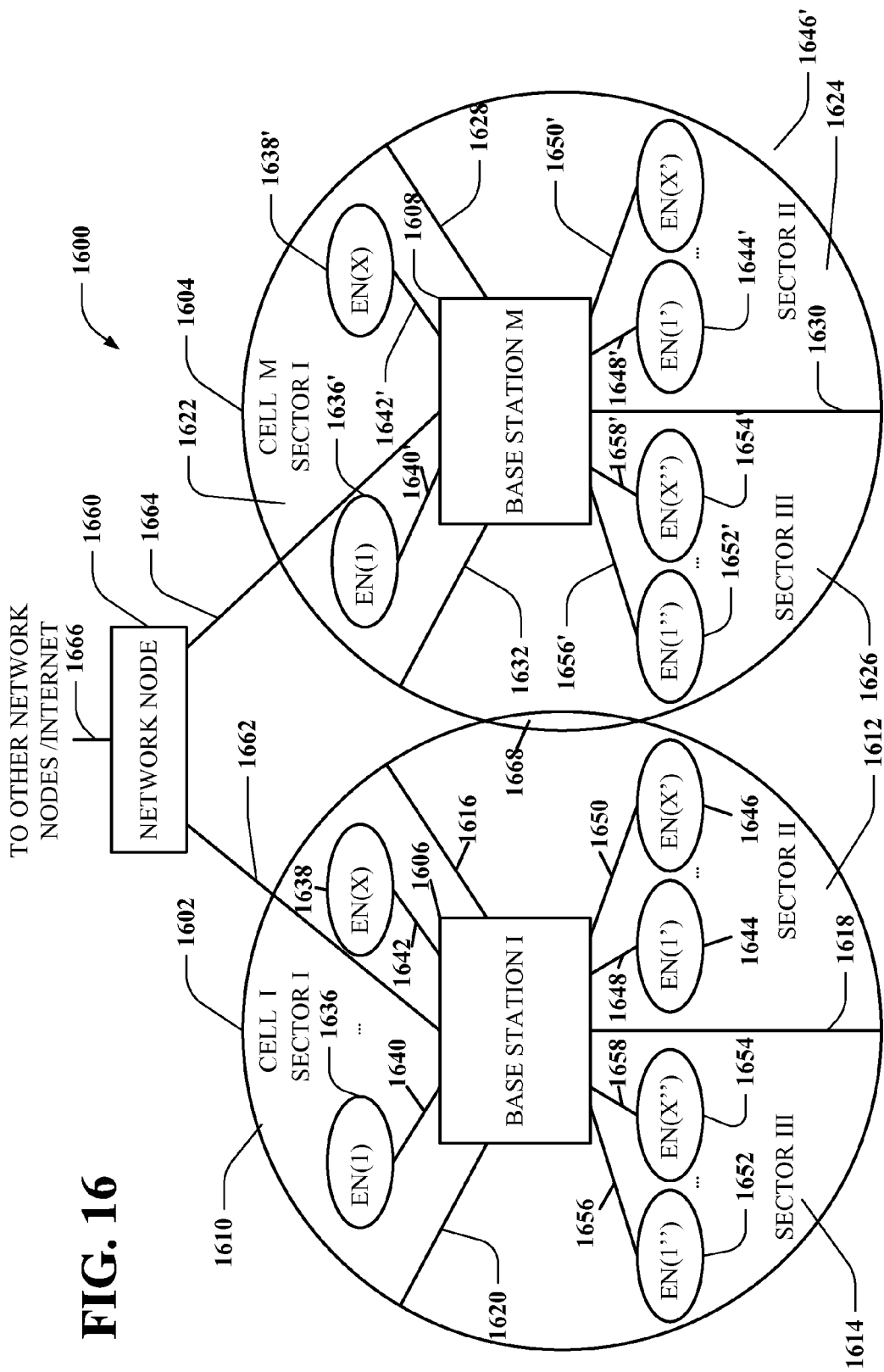
FIG. 16 is an illustration of an exemplary communication system implemented in accordance with various aspects including multiple cells.

Referring next to FIG. 16, an exemplary communication system 1600 implemented in accordance with various aspects is provided including multiple cells: cell 1 1602, cell M 1604. Here, it should be noted that neighboring cells 1602, 1604 overlap slightly, as indicated by cell boundary region 1668, thereby creating potential for signal interference between signals transmitted by base stations in neighboring cells. Each cell 1602, 1604 of system 1600 includes three sectors. Cells which have not been subdivided into multiple sectors (N=1), cells with two sectors (N=2) and cells with more than 3 sectors (N>3) are also possible in accordance with various aspects. Cell 1602 includes a first sector, sector I 1610, a second sector, sector II 1612, and a third sector, sector III 1614. Each sector 1610, 1612, and 1614 has two sector boundary regions; each boundary region is shared between two adjacent sectors.

Sector boundary regions provide potential for signal interference between signals transmitted by base stations in neighboring sectors. Line 1616 represents a sector boundary region between sector I 1610 and sector II 1612; line 1618 represents a sector boundary region between sector II 1612 and sector III 1614; line 1620 represents a sector boundary region between sector III 1614 and sector I 1610. Similarly, cell M 1604 includes a first sector, sector I 1622, a second sector, sector II 1624, and a third sector, sector III 1626. Line 1628 represents a sector boundary region between sector I 1622 and sector II 1624; line 1630 represents a sector boundary region between sector II 1624 and sector III 1626; line 1632 represents a boundary region between sector III 1626 and sector I 1622. Cell I 1602 includes a base station (BS), base station I 1606, and a plurality of end nodes (ENs) in each sector 1610, 1612, 1614. Sector I 1610 includes EN(1) 1636 and EN(X) 1638 coupled to BS 1606 via wireless links 1640, 1642, respectively; sector II 1612 includes EN(1') 1644 and EN(X') 1646 coupled to BS 1606 via wireless links 1648, 1650, respectively; sector III 1614 includes EN(1") 1652 and EN(X") 1654 coupled to BS 1606 via wireless links 1656, 1658, respectively. Similarly, cell M 1604 includes base station M 1608, and a plurality of end nodes (ENs) in each sector 1622, 1624, and 1626. Sector I 1622 includes EN(1) 1636' and EN(X) 1638' coupled to BS M 1608 via wireless links 1640', 1642', respectively; sector II 1624 includes EN(1') 1644' and EN(X') 1646' coupled to BS M 1608 via wireless links 1648', 1650', respectively; sector 3 1626 includes EN(1") 1652' and EN(X") 1654' coupled to BS 1608 via wireless links 1656', 1658', respectively.

System 1600 also includes a network node 1660 which is coupled to BS I 1606 and BS M 1608 via network links 1662, 1664, respectively. Network node 1660 is also coupled to other network nodes, e.g., other base stations, AAA server nodes, intermediate nodes, routers, etc. and the Internet via network link 1666. Network links 1662, 1664, 1666 may be, e.g., fiber optic cables. Each end node, e.g. EN 1 1636 may be a wireless terminal including a transmitter as well as a receiver. The wireless terminals, e.g., EN(1) 1636 may move through system 1600 and may communicate via wireless links with the base station in the cell in which the EN is currently located. The wireless terminals, (WTs), e.g. EN(1)

1636, may communicate with peer nodes, e.g., other WTs in system 1600 or outside system 1600 via a base station, e.g. BS 1606, and/or network node 1660. WTs, e.g., EN(1) 1636 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 17:
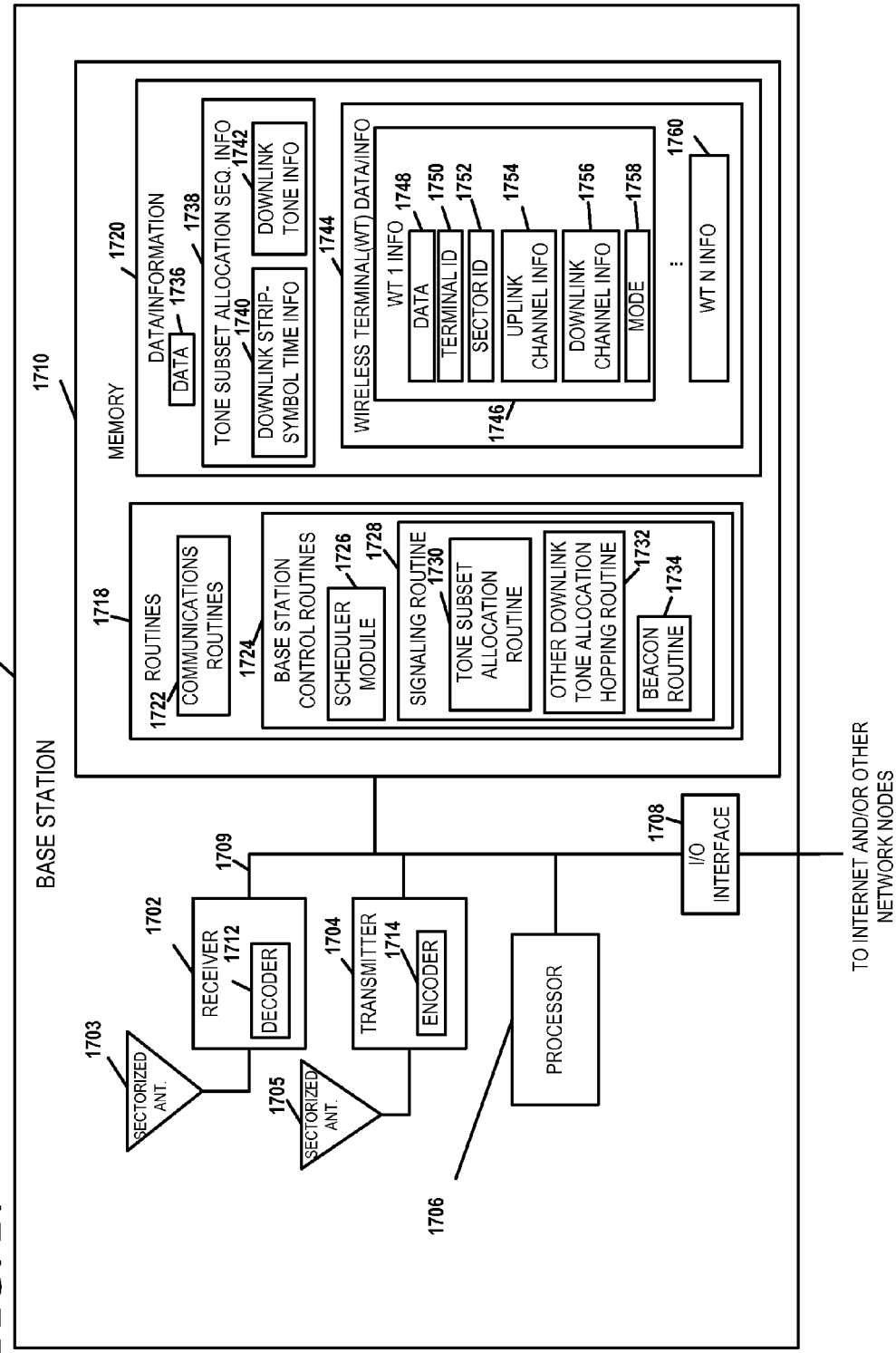
FIG. 17 is an illustration of an exemplary base station in accordance with various aspects described herein.

FIG. 17 illustrates an example base station 1700 in accordance with various aspects. Base station 1700 implements tone subset allocation sequences, with different tone subset allocation sequences generated for respective different sector types of the cell. Base station 1700 may be used as any one of base stations 1606, 1608 of the system 1600 of FIG. 16. The base station 1700 includes a receiver 1702, a transmitter 1704, a processor 1706, e.g., CPU, an input/output interface 1708 and memory 1710 coupled together by a bus 1709 over which various elements 1702, 1704, 1706, 1708, and 1710 may interchange data and information.

Sectorized antenna 1703 coupled to receiver 1702 is used for receiving data and other signals, e.g., channel reports, from wireless terminals transmissions from each sector within the base station's cell. Sectorized antenna 1705 coupled to transmitter 1704 is used for transmitting data and other signals, e.g., control signals, pilot signal, beacon signals, etc. to wireless terminals 1800 (see FIG. 18) within each sector of the base station's cell. In various aspects, base station 1700 may employ multiple receivers 1702 and multiple transmitters 1704, e.g., an individual receivers 1702 for each sector and an individual transmitter 1704 for each sector. Processor 1706, may be, e.g., a general purpose central processing unit (CPU). Processor 1706 controls operation of base station 1700 under direction of one or more routines 1718 stored in memory 1710 and implements the methods. I/O interface 1708 provides a connection to other network nodes, coupling the BS 1700 to other base stations, access routers, AAA server nodes, etc., other networks, and the Internet. Memory 1710 includes routines 1718 and data/information 1720.

Data/information 1720 includes data 1736, tone subset allocation sequence information 1738 including downlink strip-symbol time information 1740 and downlink tone information 1742, and wireless terminal (WT) data/info 1744 including a plurality of sets of WT information: WT 1 info 1746 and WT N info 1760. Each set of WT info, e.g., WT 1 info 1746 includes data 1748, terminal ID 1750, sector ID 1752, uplink channel information 1754, downlink channel information 1756, and mode information 1758.

Routines 1718 include communications routines 1722 and base station control routines 1724. Base station control routines 1724 includes a scheduler module 1726 and signaling routines 1728 including a tone subset allocation routine 1730 for strip-symbol periods, other downlink tone allocation hopping routine 1732 for the rest of symbol periods, e.g., non strip-symbol periods, and a beacon routine 1734.

Data 1736 includes data to be transmitted that will be sent to encoder 1714 of transmitter 1704 for encoding prior to transmission to WTs, and received data from WTs that has been processed through decoder 1712 of receiver 1702 following reception. Downlink strip-symbol time information 1740 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1742 includes information including a carrier frequency assigned to the base station 1700, the number and frequency of tones, and the set of tone subsets to be allocated to the strip-symbol periods, and other cell and sector specific values such as slope, slope index and sector type.

Data 1748 may include data that WT1 1800 has received from a peer node, data that WT 1 1800 desires to be transmitted to a peer node, and downlink channel quality report feedback information. Terminal ID 1750 is a base station 1700 assigned ID that identifies WT 1 1800. Sector ID 1752 includes information identifying the sector in which WT1 1800 is operating. Sector ID 1752 can be used, for example, to determine the sector type. Uplink channel information 1754 includes information identifying channel segments that have been allocated by scheduler 1726 for WT1 1800 to use, e.g., uplink traffic channel segments for data, dedicated uplink control channels for requests, power control, timing control, etc. Each uplink channel assigned to WT1 1800 includes one or more logical tones, each logical tone following an uplink hopping sequence. Downlink channel information 1756 includes information identifying channel segments that have been allocated by scheduler 1726 to carry data and/or information to WT1 1800, e.g., downlink traffic channel segments for user data. Each downlink channel assigned to WT1 1800 includes one or more logical tones, each following a downlink hopping sequence. Mode information 1758 includes information identifying the state of operation of WT1 1800, e.g. sleep, hold, on.

Communications routines 1722 control the base station 1700 to perform various communications operations and implement various communications protocols. Base station control routines 1724 are used to control the base station 1700 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1728 controls the operation of receiver 1702 with its decoder 1712 and transmitter 1704 with its encoder 1714. The signaling routine 1728 is responsible controlling the generation of transmitted data 1736 and control information. Tone subset allocation routine 1730 constructs the tone subset to be used in a strip-symbol period using the method of the aspect and using data/info 1720 including downlink strip-symbol time info 1740 and sector ID 1752. The downlink tone subset allocation sequences will be different for each sector type in a cell and different for adjacent cells. The WTs 1800 receive the signals in the strip-symbol periods in accordance with the downlink tone subset allocation sequences; the base station 1700 uses the same downlink tone subset allocation sequences in order to generate the transmitted signals. Other downlink tone allocation hopping routine 1732 constructs downlink tone hopping sequences, using information including downlink tone information 1742, and downlink channel information 1756, for the symbol periods other than the strip-symbol periods. The downlink data tone hopping sequences are synchronized across the sectors of a cell. Beacon routine 1734 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 18:
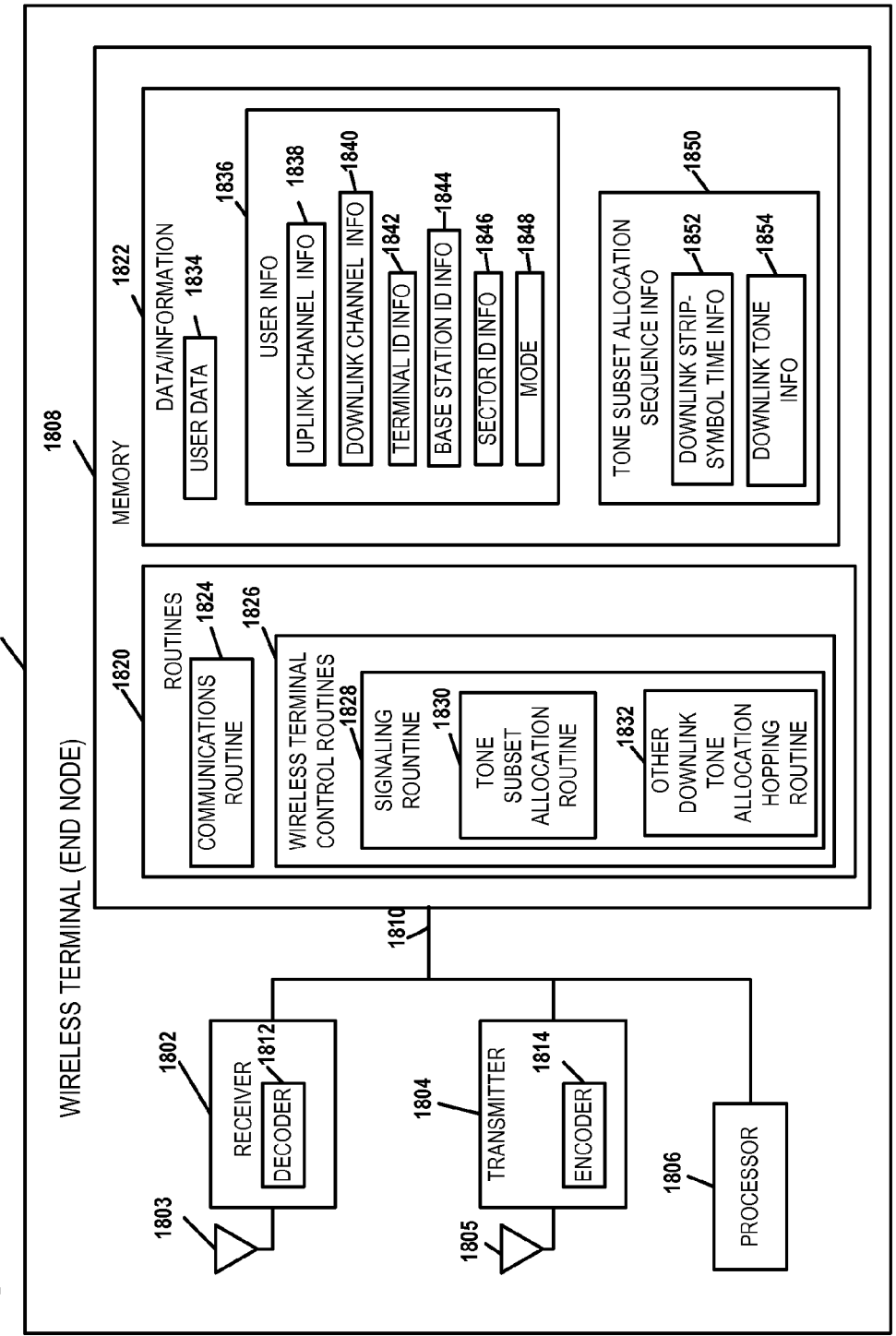
FIG. 18 is an illustration of an exemplary wireless terminal implemented in accordance with various aspects described herein.

FIG. 18 illustrates an example wireless terminal (end node) 1800 which can be used as any one of the wireless terminals (end nodes), e.g., EN(1) 1636, of the system 1600 shown in FIG. 16. Wireless terminal 1800 implements the tone subset allocation sequences. The wireless terminal 1800 includes a receiver 1802 including a decoder 1812, a transmitter 1804 including an encoder 1814, a processor 1806, and memory 1808 which are coupled together by a bus 1810 over which the various elements 1802, 1804, 1806, 1808 can interchange data and information. An antenna 1803 used for receiving signals from a base station (and/or a disparate wireless terminal) is coupled to receiver 1802. An antenna 1805 used for transmitting signals, e.g., to a base station (and/or a disparate wireless terminal) is coupled to transmitter 1804.

The processor 1806, e.g., a CPU controls the operation of the wireless terminal 1800 and implements methods by executing routines 1820 and using data/information 1822 in memory 1808.

Data/information 1822 includes user data 1834, user information 1836, and tone subset allocation sequence information 1850. User data 1834 may include data, intended for a peer node, which will be routed to encoder 1814 for encoding prior to transmission by transmitter 1804 to a base station, and data received from the base station which has been processed by the decoder 1812 in receiver 1802. User information 1836 includes uplink channel information 1838, downlink channel information 1840, terminal ID information 1842, base station ID information 1844, sector ID information 1846, and mode information 1848. Uplink channel information 1838 includes information identifying uplink channels segments that have been assigned by a base station for wireless terminal 1800 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1840 includes information identifying downlink channel segments that have been assigned by a base station to WT 1800 for use when the base station is transmitting data/information to WT 1800. Downlink channels may include downlink traffic channels and assignment channels, each downlink channel including one or more logical tone, each logical tone following a downlink hopping sequence, which is synchronized between each sector of the cell.

User info 1836 also includes terminal ID information 1842, which is a base station-assigned identification, base station ID information 1844 which identifies the specific base station that WT has established communications with, and sector ID info 1846 which identifies the specific sector of the cell where WT 1800 is presently located. Base station ID 1844 provides a cell slope value and sector ID info 1846 provides a sector index type; the cell slope value and sector index type may be used to derive tone hopping sequences. Mode information 1848 also included in user info 1836 identifies whether the WT 1800 is in sleep mode, hold mode, or on mode.

Tone subset allocation sequence information 1850 includes downlink strip-symbol time information 1852 and downlink tone information 1854. Downlink strip-symbol time information 1852 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1854 includes information including a carrier frequency assigned to the base station, the number and frequency of tones, and the set of tone subsets to be allocated to the strip-symbol periods, and other cell and sector specific values such as slope, slope index and sector type.

Routines 1820 include communications routines 1824 and wireless terminal control routines 1826. Communications routines 1824 control the various communications protocols used by WT 1800. Wireless terminal control routines 1826 controls basic wireless terminal 1800 functionality including the control of the receiver 1802 and transmitter 1804. Wireless terminal control routines 1826 include the signaling routine 1828. The signaling routine 1828 includes a tone subset allocation routine 1830 for the strip-symbol periods and an other downlink tone allocation hopping routine 1832 for the rest of symbol periods, e.g., non strip-symbol periods. Tone subset allocation routine 1830 uses user data/info 1822 including downlink channel information 1840, base station ID info 1844, e.g., slope index and sector type, and downlink tone information 1854 in order to generate the downlink tone subset allocation sequences in accordance with some aspects and process received data transmitted from the base station. Other downlink tone allocation hopping routine 1830 constructs downlink tone hopping sequences, using information including downlink tone information 1854, and downlink channel information 1840, for the symbol periods other than the strip-symbol periods. Tone subset allocation routine 1830, when executed by processor 1806, is used to determine when and on which tones the wireless terminal 1800 is to receive one or more strip-symbol signals from the base station 1700. The uplink tone allocation hopping routine 1830 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method that facilitates operating a relay via a Multimedia Broadcast Single Frequency Network based backhaul link, the method comprising:
   allocating a first set of control resources and a second set of control resources within a sub-frame;
   concatenating a first portion of control resources with a second portion of control resources to form a set of concatenated resources, the first portion of control resources associated with the first set of control resources, the second portion of control resources associated with the second set of control resources; and
   transmitting at least one control signal using a subset of the set of concatenated resources.

2. The method of claim 1, wherein the first set of control resources is within a legacy control region, and wherein the second set of control resources is within a non-legacy control region.

3. The method of claim 2, further comprising providing the legacy control region in a time-division multiplexed format.

4. The method of claim 3, wherein the legacy control region includes up to two Orthogonal Frequency Division Multiplexing symbols.

5. The method of claim 2, further comprising providing the non-legacy control region in a time-division multiplexed format.

6. The method of claim 2, further comprising providing the non-legacy control region in a frequency-division multiplexed format.

7. The method of claim 2, further comprising providing the non-legacy control region in a format that combines a frequency-division multiplexed format and a time-division multiplexed format.

8. The method of claim 1, wherein the at least one control signal is a Physical Hybrid Automatic Repeat Request Indicator Channel.

9. The method of claim 8, further comprising ascertaining a Hybrid Automatic Repeat Request resource for an actual Physical Uplink Shared Channel transmission within the subset of the set of concatenated resources based on a lowest physical resource block of the actual Physical Uplink Shared Channel transmission.

10. The method of claim 1, wherein the at least one control signal is a Physical Downlink Control Channel.

11. The method of claim 10, further comprising ascertaining a set of Physical Downlink Control Channel decoding candidates within the subset of the set of concatenated resources for an aggregation level associated with a non-legacy user equipment, the concatenating based on the aggregation level.

12. The method of claim 1, further comprising ascertaining a Hybrid Automatic Repeat Request resource based on the subset of the set of concatenated resources for a Physical Downlink Shared Channel transmission associated with a non-legacy user.

13. The method of claim 1, the transmitting including communicating a first control signal and a second control signal, the first control signal includes at least the first set of control resources, the second control signal includes the first set of control resources and the second set of control resources.

14. The method of claim 13, further comprising excluding the second set of control resources from the first control signal, and communicating the first control signal to a legacy user equipment.

15. The method of claim 13, further comprising communicating the second control signal to a non-legacy user equipment.

16. The method of claim 13, further comprising communicating the second control signal to a relay node.

17. An apparatus configured to facilitate operating a relay via a Multimedia Broadcast Single Frequency Network based backhaul link, the apparatus comprising:
a processor configured to execute computer executable components stored in memory, the components including:
an allocation component configured to allocate a first set of control resources and a second set of control resources within a sub-frame;
a concatenating component configured to perform a concatenation of a first portion of control resources with a second portion of control resources to form a set of concatenated resources, the first portion of control resources associated with the first set of control resources, the second portion of control resources associated with the second set of control resources;
a generation component configured to generate at least one control signal, the at least one control signal including a subset of the set of concatenated resources; and
a communication component configured to communicate the at least one control signal to at least one of a direct-link user equipment or a relay node.

18. The apparatus of claim 17, wherein the first set of control resources is within a legacy control region, and wherein the second set of control resources is within a non-legacy control region.

19. The apparatus of claim 18, the communication component configured to provide the legacy control region in a time-division multiplexed format.

20. The apparatus of claim 19, wherein the legacy control region includes up to two Orthogonal Frequency Division Multiplexing symbols.

21. The apparatus of claim 18, the communication component configured to provide the non-legacy control region in a time-division multiplexed format.

22. The apparatus of claim 18, the communication component configured to provide the non-legacy control region in a frequency-division multiplexed format.

23. The apparatus of claim 18, the communication component configured to provide the non-legacy control region in a format that combines a frequency-division multiplexed format and a time-division multiplexed format.

24. The apparatus of claim 17, wherein the at least one control signal is a Physical Hybrid Automatic Repeat Request Indicator Channel.

25. The apparatus of claim 24, the concatenating component further configured to ascertain a Hybrid Automatic Repeat Request resource for an actual Physical Uplink Shared Channel transmission within the subset of the set of concatenated resources based on a lowest physical resource block of the actual Physical Uplink Shared Channel transmission.

26. The apparatus of claim 17, wherein the at least one control signal is a Physical Downlink Control Channel.

27. The apparatus of claim 26, the concatenating component further configured to ascertain a set of Physical Downlink Control Channel decoding candidates within the subset of the set of concatenated resources for an aggregation level associated with a non-legacy user equipment, wherein the concatenation is based on the aggregation level.

28. The apparatus of claim 17, the concatenating component further configured to ascertain a Hybrid Automatic Repeat Request resource based on the subset of the set of concatenated resources for a Physical Downlink Shared Channel transmission associated with a non-legacy user.

29. The apparatus of claim 17, the communication component further configured to transmit a first control signal and a second control signal, the first control signal includes at least the first set of control resources, the second control signal includes the first set of control resources and the second set of control resources.

30. The apparatus of claim 29, wherein the generation component is configured to exclude the second set of control resources from the first control signal, and wherein the communication component is configured to provide the first control signal to a legacy user equipment.

31. The apparatus of claim 29, wherein the communication component is configured to transmit the second control signal to a non-legacy user equipment.

32. The apparatus of claim 29, wherein the communication component is configured to transmit the second control signal to the relay node.

33. A computer program product that facilitates operating a relay via a Multimedia Broadcast Single Frequency Network based backhaul link, comprising a non-transitory computer-readable storage medium comprising code for causing at least one computer to:
allocate a first set of control resources and a second set of control resources within a sub-frame;
perform a concatenation of a first portion of control resources with a second portion of control resources to form a set of concatenated resources, the first portion of control resources associated with the first set of control resources, the second portion of control resources associated with the second set of control resources; and
communicate at least one control signal using a subset of the set of concatenated resources.

34. The computer program product of claim 33, wherein the at least one control signal is a Physical Hybrid Automatic Repeat Request Indicator Channel.

35. The computer program product of claim 34, the code further causing the at least one computer to ascertain a Hybrid Automatic Repeat Request resource for an actual Physical Uplink Shared Channel transmission within the subset of the set of concatenated resources based on a lowest physical resource block of the actual Physical Uplink Shared Channel transmission.

36. The computer program product of claim 33, wherein the at least one control signal is a Physical Downlink Control Channel.

37. The computer program product of claim 36, the code further causing the at least one computer to ascertain a set of Physical Downlink Control Channel decoding candidates within the subset of the set of concatenated resources for an aggregation level associated with a non-legacy user equipment, wherein the concatenation is based on the aggregation level.

38. An apparatus configured to operating a relay via a Multimedia Broadcast Single Frequency Network based backhaul link, the apparatus comprising:
means for allocating a first set of control resources and a second set of control resources within a sub-frame;
means for concatenating a first portion of control resources with a second portion of control resources to form a set of concatenated resources, the first portion of control resources associated with the first set of control resources, the second portion of control resources associated with the second set of control resources; and
means for transmitting at least one control signal using a subset of the set of concatenated resources.

39. The apparatus of claim 38, the means for transmitting including communicating a first control signal and a second control signal, the first control signal includes at least the first set of control resources, the second control signal includes the first set of control resources and the second set of control resources.

40. The apparatus of claim 39, wherein the second set of control resources is excluded from the first control signal, and wherein the first control signal is communicated to a legacy user equipment.

41. A method that facilitates operating a relay via a Multimedia Broadcast Single Frequency Network based backhaul link, the method comprising:
allocating a first set of control resources and a second set of control resources associated with a Physical Hybrid Automatic Repeat Request Indicator Channel;
providing an indication of a first allocation size associated with the first set of control resources and a second allocation size associated with the second set of control resources; and
transmitting at least one control signal, the at least one control signal including the indication.

42. The method of claim 41, further comprising introducing a new set of bits in a Physical Broadcast Channel to facilitate indicating the first allocation size.

43. The method of claim 41, the indication comprising indicating the first allocation size via a Physical Broadcast Channel, wherein the second allocation size is hard-coded into the at least one control signal.

44. The method of claim 41, wherein the first allocation size is equal to the second allocation size, the transmitting comprising communicating the indication via a Physical Broadcast Channel.

45. The method of claim 41, the indication comprising communicating at least one of the first allocation size or the second allocation size via a layer three configuration.

46. The method of claim 41, wherein the first set of control resources is within a legacy control region, and wherein the second set of control resources is within a non-legacy control region.

47. The method of claim 46, further comprising providing the legacy control region in a time-division multiplexed format.

48. The method of claim 46, further comprising providing the non-legacy control region in a time-division multiplexed format.

49. The method of claim 46, further comprising providing the non-legacy control region in a frequency-division multiplexed format.

50. The method of claim 46, further comprising providing the non-legacy control region in a format that combines a frequency-division multiplexed format and a time-division multiplexed format.

51. The method of claim 41, the transmitting including communicating a first control signal and a second control signal, the first control signal includes at least the first set of control resources, the second control signal includes the first set of control resources and the second set of control resources.

52. The method of claim 51, further comprising excluding the second set of control resources from the first control signal, wherein the first control signal is communicated to a legacy user equipment.

53. The method of claim 51, wherein the second control signal is communicated to a non-legacy user equipment.

54. The method of claim 51, wherein the second control signal is communicated to a relay node.

55. An apparatus configured to facilitate operating a relay via a Multimedia Broadcast Single Frequency Network based backhaul link, the apparatus comprising:
a processor configured to execute computer executable components stored in memory, the components including:
an allocation component configured to allocate a first set of control resources and a second set of control resources associated with a Physical Hybrid Automatic Repeat Request Indicator Channel;
an indicator component configured to provide an indication of a first allocation size associated with the first set of control resources and a second allocation size associated with the second set of control resources;
a generation component configured to generate at least one control signal, the at least one control signal including the indication; and
a communication component configured to transmit the at least one control signal.

56. The apparatus of claim 55, the indicator component further configured to introduce a new set of bits in a Physical Broadcast Channel indicating the first allocation size.

57. The apparatus of claim 55, the indicator component further configured to indicate the first allocation size via a Physical Broadcast Channel, and hard-code the second allocation size into the at least one control signal.

58. The apparatus of claim 55, the indicator component further configured to make the first allocation size equal to the second allocation size, wherein the indication is communicated via a Physical Broadcast Channel.

59. The apparatus of claim 55, the indicator component further configured to indicate at least one of the first allocation size or the second allocation size via a layer three configuration.

60. The apparatus of claim 55, wherein the first set of control resources is within a legacy control region, and wherein the second set of control resources is within a non-legacy control region.

61. The apparatus of claim 60, the communication component configured to provide the legacy control region in a time-division multiplexed format.

62. The apparatus of claim 60, the communication component configured to provide the non-legacy control region in a time-division multiplexed format.

63. The apparatus of claim 60, the communication component configured to provide the non-legacy control region in a frequency-division multiplexed format.

64. The apparatus of claim 60, the communication component configured to provide the non-legacy control region in a format that combines a frequency-division multiplexed format and a time-division multiplexed format.

65. The apparatus of claim 55, the communication component further configured to transmit a first control signal and a second control signal, the first control signal includes at least the first set of control resources, the second control signal includes the first set of control resources and the second set of control resources.

66. The apparatus of claim 65, the generation component is configured to exclude the second set of control resources from the first control signal, and wherein the communication component is configured to provide the first control signal to a legacy user equipment.

67. The apparatus of claim 65, wherein the communication component is configured to provide the second control signal to a non-legacy user equipment.

68. The apparatus of claim 65, wherein the communication component is configured to provide the second control signal to a relay node.

69. A computer program product that facilitates operating a relay via a Multimedia Broadcast Single Frequency Network based backhaul link, comprising a non-transitory computer-readable storage medium comprising code for causing at least one computer to:
allocate a first set of control resources and a second set of control resources associated with a Physical Hybrid Automatic Repeat Request Indicator Channel;
provide an indication of a first allocation size associated with the first set of control resources and a second allocation size associated with the second set of control resources; and
transmit at least one control signal, the at least one control signal including the indication.

70. The computer program product of claim 69, the code further causing the at least one computer to introduce a new set of bits in a Physical Broadcast Channel to facilitate indicating the first allocation size.

71. The computer program product of claim 69, the code further causing the at least one computer to indicate the first allocation size via a Physical Broadcast Channel, and hard-code the second allocation size into the at least one control signal.

72. An apparatus configured to facilitate operating a relay via a Multimedia Broadcast Single Frequency Network based backhaul link, the apparatus comprising:
means for allocating a first set of control resources and a second set of control resources associated with a Physical Hybrid Automatic Repeat Request Indicator Channel;
means for providing an indication of a first allocation size associated with the first set of control resources and a second allocation size associated with the second set of control resources; and
means for communicating at least one control signal, the at least one control signal including the indication.

73. The apparatus of claim 72, the means for providing the indication further configured to make the first allocation size equal to the second allocation size, wherein the indication is communicated via a Physical Broadcast Channel.

74. The apparatus of claim 72, the means for providing the indication further configured to indicate at least one of the first allocation size or the second allocation size via a layer three configuration.

75. A method that facilitates decoding a control signal, comprising:
configuring a user equipment to implement a decoding scheme;
receiving a set of control symbols, the set of control symbols including at least one of a first set of control resources or a second set of control resources; and
executing the decoding scheme to decode at least one of a concatenation or an indication, the concatenation concatenating a first portion of control resources with a second portion of control resources, the first portion of control resources associated with the first set of control resources and the second portion of control resources associated with the second set of control resources, the indication indicating a first allocation size associated with the first set of control resources and a second allocation size associated with the second set of control resources.

76. The method of claim 75, further comprising decoding the first allocation size via a set of newly introduced bits in a Physical Broadcast Channel, the first allocation size associated with a non-legacy user equipment.

77. The method of claim 75, the set of control symbols associated with a Physical Hybrid Automatic Repeat Request Indicator Channel.

78. The method of claim 75, the set of control symbols associated with a Physical Downlink Control Channel.

79. An apparatus configured to facilitate decoding a control signal, the apparatus comprising:
a processor configured to execute computer executable components stored in memory, the components including:
a configuration component configured to initialize a user equipment to implement a decoding scheme;
a communication component configured to receive a set of control symbols, the set of control symbols including at least one of a first set of control resources or a second set of control resources; and
a decoding component configured to ascertain at least one of a concatenation or an indication based on the decoding scheme, the concatenation concatenating a first portion of control resources with a second portion of control resources, the first portion of control resources associated with the first set of control resources and the second portion of control resources associated with the second set of control resources, the indication indicating a first allocation size associated with the first set of control resources and a second allocation size associated with the second set of control resources.

80. The apparatus of claim 79, wherein the decoding component is configured to ascertain the first allocation size via a set of newly introduced bits in a Physical Broadcast Channel, the first allocation size associated with a non-legacy user equipment.

81. The apparatus of claim 79, the set of control symbols associated with a Physical Hybrid Automatic Repeat Request Indicator Channel.

82. The apparatus of claim 79, the set of control symbols associated with a Physical Downlink Control Channel.

83. A computer program product that facilitates decoding a control signal, comprising a non-transitory computer-readable storage medium comprising code for causing at least one computer to:
  configure a user equipment to implement a decoding scheme;
  receive a set of control symbols, the set of control symbols including at least one of a first set of control resources or a second set of control resources; and
  ascertain at least one of a concatenation or an indication based on the decoding scheme, the concatenation concatenating a first portion of control resources with a second portion of control resources, the first portion of control resources associated with the first set of control resources and the second portion of control resources associated with the second set of control resources, the indication indicating a first allocation size associated with the first set of control resources and a second allocation size associated with the second set of control resources.

84. The computer program product of claim 83, the code further causing the at least one computer to ascertain the first allocation size via a set of newly introduced bits in a Physical Broadcast Channel, the first allocation size associated with a non-legacy user equipment.

85. The computer program product of claim 83, the set of control symbols associated with a Physical Hybrid Automatic Repeat Request Indicator Channel.

86. An apparatus configured to facilitate decoding a control signal, the apparatus comprising:
  means for configuring a user equipment to implement a decoding scheme;
  means for receiving a set of control symbols, the set of control symbols including at least one of a first set of control resources or a second set of control resources; and
  means for determining at least one of a concatenation or an indication according to the decoding scheme, the concatenation concatenating a first portion of control resources with a second portion of control resources, the first portion of control resources associated with the first set of control resources and the second portion of control resources associated with the second set of control resources, the indication indicating a first allocation size associated with the first set of control resources and a second allocation size associated with the second set of control resources.

87. The apparatus of claim 80, the set of control symbols associated with a Physical Downlink Control Channel.

* * * * *